United States Patent [19]
Nakamura

[11] Patent Number: 5,937,206
[45] Date of Patent: Aug. 10, 1999

[54] SYSTEM FOR CONVERTING STATES OF DMA REQUESTS INTO FIRST SERIAL INFORMATION AND TRANSMITTING INFORMATION TO FIRST BUS WHENEVER A STATE CHANGE OF A REQUEST

[75] Inventor: Nobutaka Nakamura, Tokyo, Japan

[73] Assignee: Kabushiki Kaisha Toshiba, Kawasaki, Japan

[21] Appl. No.: 08/694,749

[22] Filed: Aug. 9, 1996

[30] Foreign Application Priority Data

Aug. 11, 1995 [JP] Japan ................................. 7-205682

[51] Int. Cl.⁶ ................................................ G06F 13/16
[52] U.S. Cl. ........................ 395/842; 395/839; 395/292
[58] Field of Search ................................. 395/842, 848, 395/306, 308, 309, 292, 839; 364/242.3, 242.6

[56] References Cited

U.S. PATENT DOCUMENTS

| 4,897,786 | 1/1990 | Pimm et al. | 395/288 |
|---|---|---|---|
| 5,123,092 | 6/1992 | Buxton et al. | 395/287 |
| 5,396,602 | 3/1995 | Amini et al. | 395/325 |
| 5,398,243 | 3/1995 | Aguilhon et al. | 370/85.6 |
| 5,418,914 | 5/1995 | Heil et al. | 395/293 |
| 5,450,551 | 9/1995 | Amini et al. | 395/325 |
| 5,546,587 | 8/1996 | Silver | 395/730 |
| 5,574,869 | 11/1996 | Young et al. | 395/306 |
| 5,581,782 | 12/1996 | Sarangdhar et al. | 395/800 |
| 5,619,661 | 4/1997 | Crews et al. | 395/299 |
| 5,640,520 | 6/1997 | Tetrick | 395/293 |
| 5,729,762 | 3/1998 | Kardach et al. | 395/842 |

FOREIGN PATENT DOCUMENTS

| 5-81173 | 4/1993 | Japan . |
|---|---|---|
| 6-337841 | 12/1994 | Japan . |

OTHER PUBLICATIONS

PCI Local Bus Specification, PCI Special Intrest Group, Revision 2.1 (1995).
PCI Local Bus Specification, PCI Special Interest Group, Revision 2.1, Jun. 1, 1995.
"82C37A–5 CHMOS High Performance Programmable DMA Controller," Intel: *Peripheral Components*, 1993, pp. 3–33 to 3–50.
Mobile PC/PCI DMA Arbitration and Protocols: MHPG Architecture Functional Architecture Specification, Intel Corporation, Revision 2.2, Apr. 22, 1996.

*Primary Examiner*—Thomas C. Lee
*Assistant Examiner*—Anderson I. Chen
*Attorney, Agent, or Firm*—Finnegan, Henderson, Farabow, Garrett & Dunner, L.L.P.

[57] ABSTRACT

A DS-PCI/ISA bridge device for controlling I/O devices on an external PCI bus and an external ISA bus has the two operation states of proceed and freeze. When the DS-PCI/ISA bridge device receives a serial GNT# from a DMAC core, the operation state is switched from proceed to freeze. In the freeze state, a serial REQ# cycle is only executed when a change has occurred in the state of a DMA request of the I/O device which the DACK# has notified. Execution of serial REQ# cycles for reporting state changes in DMA requests relating to other I/O devices is frozen. Further, the DMAC core is notified whether or not an initiated serial transfer cycle is a cycle for notifying that the DMA request from an I/O device for which notification of DMA cycle execution has been given is inactive, according to the length of the inactive time period of a serial REQ# from the I/O devices. Moreover, the DMAC core transmits by a serial transfer cycle utilizing a serial GNT#, not only serial information for specifying DMA channels for which DMA cycles are executed, but also mode information for indicating whether the DMA channels are set up in cascade mode. If a DMA channel for which a DMA cycle is executed is in the cascade mode, subsequent bus cycles are executed by a bus master.

48 Claims, 9 Drawing Sheets

SYSTEM FOR CONVERTING STATES OF DMA REQUESTS INTO FIRST SERIAL INFORMATION AND TRANSMITTING INFORMATION TO FIRST BUS WHENEVER A STATE CHANGE OF A REQUEST

BACKGROUND OF THE INVENTION

1. Field of the Invention

This invention relates to a computer system with an expansion unit, and especially to controlling both a DMA transfer and a normal transfer between the expansion unit and a computer body.

2. Description of the Related Art

Conventionally, although ISA (Industry Standard Architecture) and EISA (Extended ISA) buses are conventional system buses used in personal computers, recently a PCI (Peripheral Component Interconnect) bus has been employed in desktop type personal computers to increase the speed of data transfer and organize system architecture, independently of the kind of processor.

In a PCI bus, block transfer is the basis of substantially all data transfer. Transfer of each block is effected by burst transmission. For example, a maximum data transfer speed of 133 megabytes/sec. is effected, when the data bus has a width of 32 bits.

Therefore, when a PCI bus is used, data transfer between I/O devices and between a system memory and an I/O device is executed at high speed, so that system performance is increased.

The PCI bus has not only been applied in desktop type personal computers, but also in portable personal computers such as notebook types.

In desktop type personal computers, option cards for function expansion such as ICES PCI expansion cards and ISA expansion cards are directly mounted in an expansion slot on the system board. In such cases, a plurality of pairs of DMA request signal (DREQ) lines and DMA acknowledgment (DACK#) lines corresponding to a plurality of types of DMA channels are defined for each ISA expansion slot to which an ISA expansion card is connected (one pair of lines per slot). As a result, because each ISA expansion card uses a specific DMA channel such as one combination of DREQ and DACK# corresponding to that card, the DMA transfer function of a DMAC (direct memory access controller) core on the system board is utilized.

Consequently, in a desktop type personal computer, devices which do not require a DMAC such as PCI bus masters etc., and devices which do require a DMAC such as ISA devices etc., are easily mixed.

However, even in portable personal computers, it is necessary to mount option cards such as PCI expansion cards and ISA expansion cards via an expansion unit known as a desk station. In such a case, it is necessary to reduce as much as possible the number of signal lines leading out from the portable personal computer to the desk station. This is because if the number of signal lines leading out to the desk station is increased, this leads to an increase in the number of pins of the LSI circuit mounted on the system board for interfacing with the desk station. Further, this leads to an increase in the number of pins of the connector for connecting the portable personal computer and the desk station. These increases in turn result in an increase in the cost of the portable personal computer and reduction of system mounting efficiency.

As a result, there are not provided a plurality of pairs of DMA request signal (DREQ) lines and DMA acknowledgment (DACK#) lines leading out to the desk station. However, if control lines for DMA transfer are not provided to the desk station, option cards such as ISA cards cannot utilize DMA transfer.

Recently, a protocol for transmitting and receiving DMA request signals (DREQ) and DMA acknowledgment (DACK#) signals between an ISA expansion card installed in the desk station and a MAC core on the system board, without using a plurality of pairs of DMA request signal (DREQ) lines and DMA acknowledgment (DACK#) lines, has been considered.

This protocol uses a pair of signals consisting of a bus access request signal (REQ#) and a bus access enable signal (GNT#) on a PCI bus. Under this protocol, DMA requests (DREQ) of a plurality of channels are transferred from the ISA expansion card of the desk station to the MAC core connected to the PCI bus by means of a serial transfer for DMA request signals (DREQ) and a bus access request signal (REQ#). Also, DACK# are transferred from the MAC core to the ISA expansion card of the desk station by means of serial transfer for DMA acknowledgment (DACK#) and a bus access enable signal (GNT#) indicating access to the bus has been granted. Hereafter, REQ# and GNT# used for a serial transfer of DREQ and DACK# are designated serial REQ# and serial GNT#.

By providing a PCI-ISA bridge interface in the desk station, the DMA serial channel protocol which serially transfers a plurality of DMA channels in this way needs only signal lines corresponding to a PCI bus leading out to the desk station. Therefore, it is possible to use both PCI expansion cards and ISA expansion cards.

However, the PCI-ISA bridge within the desk station needs a process for serializing DMA request signals (DREQ) of a plurality of channels and a process for serial-to-parallel converting DREQ channel information provided by a serial transfer from the DMAC core and imposes DMA within the DMAC core, with regard to notification of DMA request signals (DREQ). Therefore, substantial time is required from generation of a DMA request signal (DREQ) from the ISA expansion card to reception of the DMA request signal by the DMAC core.

Moreover the PCI-ISA bridge needs a process for serializing DACK# of a plurality of channels at the DMAC core end and a process for serial-to-parallel converting DACK# channel information provided by a serial transfer and a process for returning to the original DACK#, with regard to the serialized DACK#. Therefore such notification takes substantial time.

When transmission and reception of DREQ and DACK# by using the DMA serial channel protocol takes substantial time, a misoperation can occur. A mechanism of this misoperation is explained with reference to FIG. 1 and FIG. 2.

FIG. 1 shows a system block diagram of a conventional portable computer which utilizes a DMA serial channel protocol. FIG. 2 shows the sequence of a conventional DMA serial channel protocol in such a portable computer.

As shown in FIG. 1, a host-PCI bridge device 102 is provided between a CPU 101 and an internal PCI bus 104, whereby the processor bus of the CPU and the internal PCI bus are connected. A system memory 103 is controlled by the host-PCI bridge device 102. Also, a DMAC core 105 is connected to the internal PCI bus 104. The internal PCI bus 104 and a desk station DS 110 are connected by a PCI-DS bridge device 106. A DS-PCI/ISA bridge device 107 is provided inside the desk station DS 110. An external PCI bus 108 and an external ISA bus 109 are connected to the DS-PCI/ISA bridge device 107.

In this system, transmission and reception of DREQ and DACK# between ISA expansion cards A and B on the external ISA bus and the DMAC core 105 on the internal PCI bus are performed as illustrated in FIG. 2, according to the following DMA serial channel protocol.

(1) The ISA expansion card A generates a DREQ A active.

(2) The DS-PCI/ISA bridge device 107 performs serial transfer by utilizing a REQ#, and transmits the DREQ A to the DMAC core. In this case, a number of serial bit strings from a start bit S of the serial REQ# indicate that the DMA channel A is active.

(3) The DMAC core receives the serial REQ# and generates an internal DREQ A (Int. DREQ A) corresponding to the DMA channel (channel A) specified by the serial bit strings. The Int. DREQ A is supplied to one DREQ input port of a plurality of channels within the DMAC core.

(4) The DMAC core performs a serial transfer by utilizing a GNT# and transmits a DACK A# corresponding to the DREQ A. In this case, the DMA channel (channel A), by which DMA transfer is executed, is selected by bits strings following the start bit S of the serial GNT#.

(5) The DS-PCI/ISA bridge device 107 receives the serial GNT# and generates a DACK A# corresponding to the DMA channel specified by the bit strings. The ISA expansion card A is notified by the DACK A# of the commencement of DMA transfer utilizing the DMA channel A.

Within such a sequence, during the period from (2) to (4), it is possible for the DS-PCI/ISA bridge device to retransmit the serial REQ#. The trigger for this retransmission is at the point when the DREQ B from the ISA expansion card B is changed to an active state.

In such a case, in order to retransmit a serial REQ# for notification that DREQ A and DREQ B are generated respectively from the two ISA expansion cards A and B, the REQ# being generated are temporarily inactive. At that time, the DMAC core erroneously judges this as being the ISA expansion card A rendering the DREQ A inactive. There is the danger that, in response, the DMA core renders the internal DREQ A inactive, As a result, the DMAC judges that DMA transfer corresponding to the ISA expansion card A was concluded. Therefore, a timing in which the DACK A# disappears results. In such a case, the DMA transfer of the ISA expansion card A finishes in an illegal state.

Further, although not shown in FIG. 2, in the period of sequence (5), if retransmission of the serial REQ# arising from generation of a DREQ B from the ISA expansion card B is performed, similarly, DMA transfer to the ISA expansion card A is interrupted.

If DMA serial channel protocol is performed in this way, notification of the state of the latest DREQ of each I/O device by one REQ# line is required. Therefore, there is a danger that the above-described problem occurs in the transfer protocols of DREQ and DACK#, with a resulting misoperation of the DMA transfer.

In addition, the DS-PCI/ISA bridge device 107 requires switching of bus direction (direction of address and control bus), according to the location in which the bus master corresponding to the DMA transfer is executed. However, in a portable computer system utilizing serial channel protocol, the timing at which this bus direction is switched is delayed. As a result, the time until execution of DMA transfer may be undesirably long.

More particularly, after the DMA transfer is ready to proceed, bus cycles generated on a PCI bus differ greatly according to whether the I/O device for which execution of DMA transfer is specified by serial transfer of the DACK# is an ISA bus master or not. Namely, the bus cycles are executed by the ISA bus master in the case in which a DACK# is sent back to an ISA bus master connected to the external ISA bus. If an ISA bus master is not connected to the external ISA bus, all bus cycles are executed by the DMAC core. As a result, a required bus direction depends on whether the I/O device is an ISA bus master or not.

Therefore, the DS-PCI/ISA bridge device 107 cannot determine whether an I/O device for which DMA transfer execution is specified is an ISA bus master or not, up to the time when a master signal MASTER# on the external ISA bus is changed. As a result, the bus direction switching timing is delayed and it takes substantial time until execution of DMA transfer commences.

SUMMARY OF THE INVENTION

An object of this invention is to provide a computer system which can eliminate misoperations and delays in bus direction control.

Another object of this invention is to improve reliability and efficiency of DMA transfer processing.

In accordance with the present invention, the foregoing objects, among others, are achieved by providing a computer system having a PCI bus and an ISA bus for having coupled thereto a plurality of I/O devices, comprising a bus arbiter, coupled to the PCI bus, for arbitrating bus accesses by using each of a pair of a bus access request signal line and a bus access enable signal line assigned to bus agents on the PCI bus; a DMA controller, coupled to the PCI bus, for executing direct memory access (DMA); a converter, coupled between the ISA bus and the PCI bus and being a bus agent on the PCI bus, for converting states of DMA request signals output from the plurality of I/O devices into first serial information, and for transmitting the first serial information using the bus access request signal line assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter; wherein, the converter includes DMA request notification means for operating in one of a proceed mode and a freeze mode, the proceed mode for transmitting serial information by using the assigned bus access request signal line whenever a state change of a DMA request signal from each of the I/O devices is generated, and for notifying the DMA controller of a state of a most recent DMA request signal, and the freeze mode for notifying the DMA controller of a state change of a DMA request signal outputted from an I/O device executing a DMA cycle; and means for switching the DMA request notification means from the proceed mode to the freeze mode, after receiving a DMA acknowledgment signal with respect to an I/O device from the request and grant manager means by using the bus access enable signal.

Also in accordance with the present invention there is provided a method of controlling an operational state of a bridge coupled between a PCI bus and an ISA bus, the PCI bus coupled to a DMAC core means to enable a DMA cycle to be performed thereon, a plurality of I/O devices coupled to the ISA bus, comprising the steps of transmitting, in a proceed mode, serial information indicating states of a plurality of DMA request signals output from each of the I/O devices to the DMAC core means by using a bus access request signal line whenever a state change of DMA request signals from the I/O devices is generated and switching from the proceed mode to a freeze mode, after receiving a DMA acknowledgment signal with respect to one of the I/O devices by using a bus access enable signal from the DMAC core means.

Further in accordance with the present invention there is provided a computer system having a PCI bus and an ISA bus for having coupled thereto a plurality of I/O devices, comprising a bus arbiter, coupled to the PCI bus, for arbitrating bus accesses using each of a pair of a bus access request signal line and a bus access enable signal line assigned to bus agents on the PCI bus; a DMA controller, coupled to the PCI bus, for executing direct memory access (DMA); a converter, coupled between the ISA bus and the PCI bus, for converting states of DMA request signals output from the plurality of I/O devices into first serial information, and for transmitting the first serial information by using the bus access request signal line assigned thereto; and request and grant manager means, coupled to the PCI bus and the DMA controller, for converting the first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter; wherein the converter includes DMA request notification means for monitoring a state change of DMA request signals from each of the I/O devices, and for transmitting serial information using the bus access request signal line whenever the state change is monitored, to notify the DMA controller of a state of a most recent DMA request signal, and for differentiating an inactive period of the bus access request signal line between a first case in which third serial information indicating that a DMA request signal from a first one of the I/O devices has been already made active and a new DMA request signal from a second one of the I/O devices is made active is retransmitted and a second case in which fourth serial information indicating that a DMA request signal from the first I/O device selected by a DMA acknowledgment signal using the bus access enable signal line has been made inactive is transmitted.

Additionally in accordance with the present invention there is provided a method of notifying a DMAC core means of an operational state of a bridge coupled between a PCI bus and an ISA bus, the PCI bus coupled to the DMAC core means to enable a DMA cycle to be performed thereon and a plurality of I/O devices coupled to the ISA bus, the method of comprising the steps of monitoring a state change of DMA request signals from each of the I/O devices; transmitting to the DMAC core means second serial information indicating that DMA request signals of both first and second ones of the I/O devices are monitored in active states, when a DMA request signal from the second I/O device is changed to active while a state of a DMA request signal of the first I/O device which has already transmitted first serial information indicating that the DMA request signal has been made active has not changed, after a bus access request signal has been changed to inactive only during a first period; and transmitting third serial information indicating that the DMA request signal from the first I/O device has been made inactive, when a DMA request signal from the first I/O device is monitored in an inactive state, after the bus access request signal has been changed to inactive for longer than a second period.

Also in accordance with the present invention there is provided a computer system having a PCI bus and an ISA bus for having coupled thereto a plurality of I/O devices, comprising a bus arbiter, coupled to the PCI bus, for arbitrating bus accesses using each of a pair of a bus access request signal line and a bus access enable signal line assigned to bus agents; a DMA controller, coupled to the PCI bus, for enabling direct memory access (DMA) to be performed on the PCI bus; a bridge, coupled between the PCI bus and the ISA bus, for converting states of a plurality of DMA request signals output from the I/O devices into first serial information, and for transmitting the first serial information using one of the bus access request signal lines assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the bridge by using the bus access enable signal line assigned into the bridge; wherein the bridge includes means for determining whether a DMA channel specifying that a DMA transfer is to be executed is in a predetermined mode, according to the second serial information; and means for controlling a bus direction corresponding respectively to a bus cycle on the PCI bus by the DMA controller and a bus cycle by one of the I/O devices, according to a result of the determining means.

Further in accordance with the present invention there is provided a method of controlling a transmission direction of address and control signals on a PCI bus connected to DMAC core means and an ISA bus having a plurality of I/O devices coupled thereto, the ISA bus coupled to the PCI bus through a bridge, the method comprising the steps of converting respective states of a plurality of DMA acknowledgment signals outputted from the DMAC core means into acknowledgment serial information; transmitting the acknowledgment serial information to the bridge using a bus access enable signal line assigned to the bridge; determining whether a DMA channel specifying that a DMA transfer is to be executed is in a predetermined mode, according to the transmitted acknowledgment serial information; and controlling a bus transmission direction corresponding respectively to a bus cycle on the PCI bus by the DMAC core means and a bus cycle by one of the I/O devices, according to a result of the determining step.

Additionally in accordance with the present invention there is provided apparatus for controlling the operational state of a bridge coupled between a first bus and a second bus having a plurality of I/O devices coupled thereto, comprising means for transmitting, in a proceed mode of the bridge, first serial information indicating states of request signals output from the plurality of I/O devices to the first bus whenever a state change of at least one of the request signals is generated; and means for switching an operation mode of the bridge from the proceed mode to a freeze mode when the bridge receives second serial information from the first bus with respect to the request signal generated by one of the I/O devices.

Also in accordance with the present invention there is provided apparatus for controlling the operation of a bridge between a first bus and a second bus, comprising means for transmitting serial information to the first bus indicating a state of a request signal output from each of a plurality of I/O devices coupled to the second bus, by using a bus access signal; and means for differentiating an inactive period of the bus access signal between a first case in which serial information indicating that a first one of the request signals has been already made active and a second one of the request signals is made active is retransmitted and a second case in which serial information indicating that the first request signal has been made inactive is transmitted.

Further in accordance with the present invention there is provided apparatus for controlling a transmission direction of a bus, comprising means for receiving serial information using a bus access enable signal line; means for determining whether a data transfer is in a predetermined mode, based on the received serial information; and means for controlling the bus transmission direction on the bus, when the determining means determines that the data transfer is in the predetermined mode.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Hereinbelow, embodiments of this invention are explained with reference to the drawings.

Figure 3:
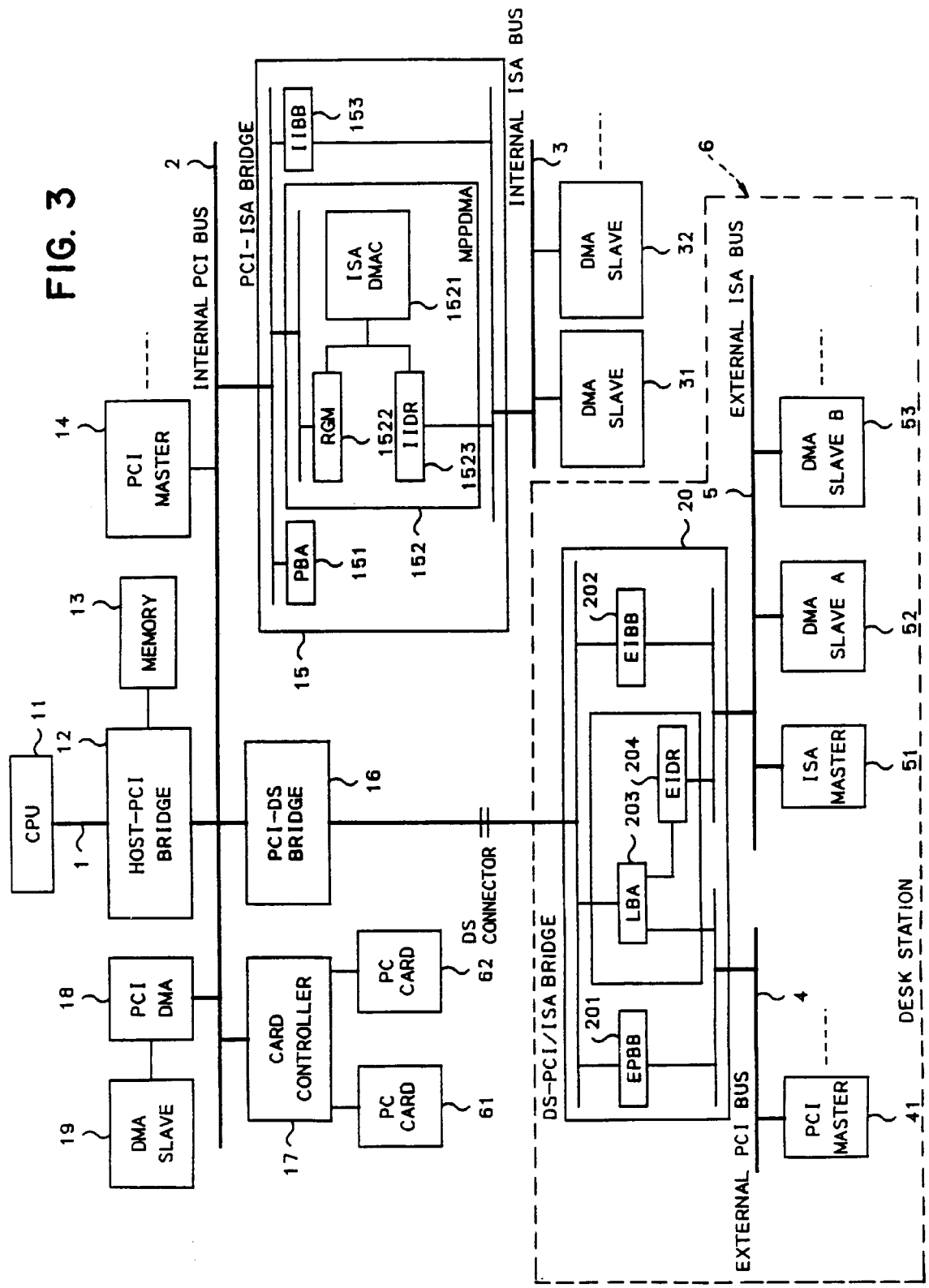
FIG. 3 is a block diagram of a portable personal computer system which utilizes an improved DMA serial channel protocol in accordance with an embodiment of this invention.

In FIG. 3, the structure of a portable computer system, according to an embodiment of this invention is explained. This computer system is a notebook type or laptop type portable computer. Three types of bus, i.e., a processor bus 1, an internal PCI bus 2 and an internal ISA bus 3, are arranged on the system board of the portable computer. An external PCI bus 4 and an external ISA bus 5 are arranged in a desk station 6 connected to a DS connector of the portable personal computer.

The system board of the portable computer includes a CPU 11, a host/PCI bridge device 12, a system memory 13, various types of PCI master devices 14, an internal PCI-ISA bridge device 15, a PCI-DS (DS: desk station) bridge device 16, a PC card controller 17, and a DMA device 18. A DS-PCI/ISA bridge device 20 is provided in the desk station.

The CPU can be provided as a "Pentium" microprocessor produced and marketed by the Intel Company. The processor bus directly connected to the input/output pins of the CPU has a 64-bit data bus.

The system memory 13 is a memory device for storing an operating system, device drivers, application programs to be executed, and data being processed. The memory device is preferably formed by a plurality of DRAMs. The system memory 13 is connected to the host/PCI bridge device 12 via a memory bus having a 32-bit or 64-bit data bus. The processor bus 1 is utilized as the data bus of the memory bus. In such a case, the memory bus is formed by an address bus and various types of memory control signal lines.

The host/PCI bridge device 12 is a bridge LSI for coupling the processor bus 2 and the internal PCI bus, and functions as a bus master of the PCI bus. The host/PCI bridge device 2 has a function of directionally converting bus cycles including data and addresses and a function of controlling access of the system memory 13 via the memory bus, between the processor bus 1 and the internal PCI bus 2.

The internal PCI bus 2 is a clock-synchronization type input/output bus. All cycles on the internal PCI bus 2 are performed in synchronism with a PCI bus clock. The frequency of the PCI bus clock is a maximum of 33 MHZ. The PCI bus has an address/data bus used in a time division manner. This address/data bus has a width of 32 bits.

A data transfer cycle on the PCI bus is formed from an address phase and one or more data phases following thereafter. An address and transfer type are output in the address phase. In the data phases, 8-bit, 16-bit, 24-bit or 32-bit data are output.

The PCI master device 14 is another bus master of the PCI bus, in addition to the host/PCI bridge device 12, and operates as an initiator or target.

The internal PCI-ISA bridge device 15 is a bridge LSI for coupling the internal PCI bus 2 and the internal ISA bus 3. A memory and a plurality of ISA I/O devices 31, 32 . . . are connected to the internal ISA bus. These I/O devices 31, 32 . . . are devices for requesting DMA transfer to DMAC incorporated in the internal PCI-ISA bridge device and are referred to herein as DMA slaves.

A PCI bus arbiter (PBA) 151, a DMAC core (MPPDMA) 152 and an internal ISA bus bridge (IIBB) 153 are incorporated in the internal PCI-ISA bridge device 15.

The PCI bus arbiter (PBA) 151 arbitrates bus accesses between all bus master devices connected to the internal PCI bus 2. In this arbitration, signal lines (a bus request signal REQ# line and a grant signal GNT# line) on the internal PCI bus are allocated in one pair to each bus master device.

The bus request signal REQ# is a signal for notifying the PCI bus arbiter (PBA) 151 of a request from a device corresponding therewith to use the internal PCI bus 2. The grant signal GNT# is a signal for notifying the device which issued the bus request signal REQ# that it has access to the PCI bus.

Also in the portable computer system, among the plurality of groups of REQ# and GNT# lines defined on the internal PCI bus 2, one REQ# and GNT# line group allocated to the DS-PCI/ISA bridge device 20 is used for a DMA serial channel protocol for transmission and reception of DREQs and DACK#s between DMA slaves connected to the external ISA bus 5.

All of the bus request signal REQ# lines and grant signal GNT# lines on the internal PCI bus 2 are connected to the PCI bus arbiter (PBA) 151. Arbitration of bus access is controlled by the PCI bus arbiter (PBA) 151.

The MAC core (MPPDMA) 152 includes an ISA DMAC 1521, a bus request and grant manager (RGM: REQ#, GNT# manager) 1522, and an internal ISA DMA router (IIDR) 1523. The DMAC core (MPPDMA) 152 is an independent function block within the internal PCI-ISA bridge device 15. Blocks 151 and 153 perform functions other than DMA.

Figure 4:
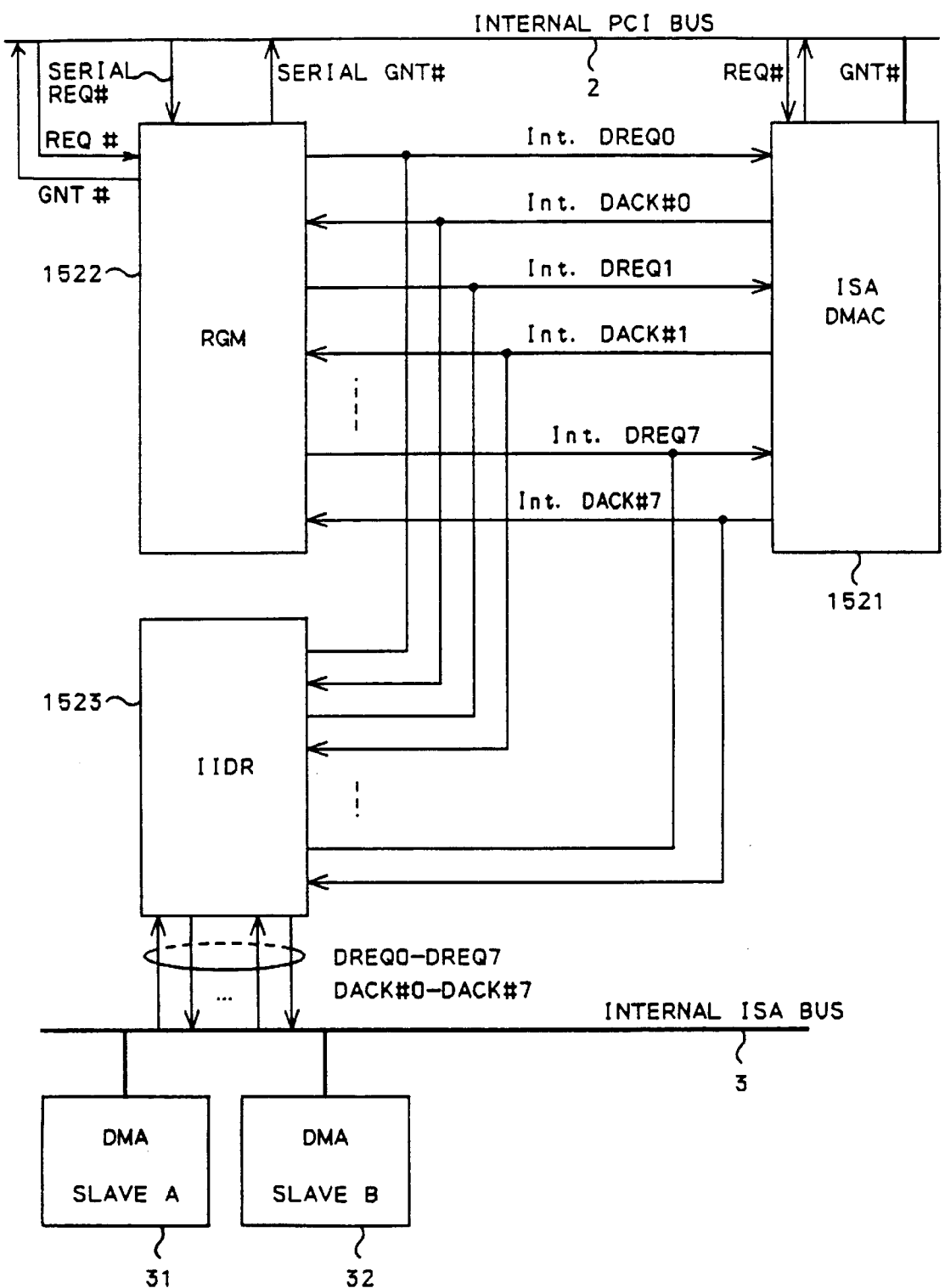
FIG. 4 is a block diagram of a DMAC core provided in the system of FIG. 3.

Interconnections between the ISADMAC 1521, the request and grant manager (RGM) 1522 and the internal ISA DMA router (IIDR) 1523 are illustrated in FIG. 4.

The ISADMAC 1521 is one of the bus masters connected to the internal PCI bus 2, and executes DMA transfer, according to a request from a DMA slave device requiring DMA transfer.

DMA slaves are logically connected to the internal PCI bus 2. Connections of the DMA slaves to the internal ISA bus or the external ISA bus through a bridges 15 or 20 are most common.

The ISADMAC 1521 has DREQ input ports where internal DREQs 0 to 7 are input and a DACK# output port for outputting internal DACK#s 0 to 7. Both the DREQ input ports and the DACK# output ports are connected to the RGM 1522 and the IIDR 1523. Transmission and reception of DREQs and DACK#s between the DMA slaves 31, 32, . . . and the ISADMAC 1521 on the internal ISA bus 3 are executed via the IIDR 1523. Also, transmission and reception of DREQs and DACK#s between an ISA master 51 and DMA slaves 52, 53, . . . on the external ISA bus 5 and the ISADMAC 1521 are performed by DMA serial channel protocol via the RGM.

Since the ISADMAC 1521 is connected to the internal PCI bus 2 and devices requesting DMA transfer are connected to the internal ISA bus 3 or the external ISA bus 5, a read cycle (I/O read or memory read) and a write cycle (memory write or I/O write) are not simultaneously generated in DMA transfer by the ISADMAC 1521. That is, first, a read cycle is performed and the read data at that time are latched in a buffer in the ISADMAC 1521. Next, a write cycle is executed and the previously latched data are output as write data.

The ISADMAC 1521 generates both a read cycle and a write cycle on the internal PCI bus 2, irrespective of whether they are memory or I/O. Further, the bridge device 15 or 20 converts a bus cycle on the internal PCI bus 2 to an ISA bus cycle. Namely, the ISADMAC 1521 generates both memory cycles and DMA exclusive I/O cycles on the internal PCI bus 2 and is not concerned with ISA bus cycles.

The ISADMAC can has one 82C37 compatible function which is the ISA bus system architecture standard, and supports DMA channels CH0 to CH7 by means of internal DREQs 0 to 7 and internal DACK#s 0 to 7. Among these channels, DMA channel 4 is not used for transfer because DMA channel CH4 is used to cascade-connect two DMAC controllers. As a result, DREQ4 and DACK#4 among the internal DREQs 0 to 7 and internal DACK#s 0 to 7 are actually not connected to either the RGM 1522 or the IIDR 1523.

The ISADMAC 1521 performs arbitration of DMA channels by using the internal DREQs 0 to 7 and internal DACK#s 0 to 7 arranged as one pair each for every DMA channel. Each internal DREQ is a DMA request signal used to notify the ISADMAC 1521 that a DMA slave is requesting execution of DMA transfer. A DACK# is a DMA acknowledgment signal by which the ISADMAC 1521 notifies a DMA slave, which has requested DMA transfer, of commencement of DMA cycle execution. The DMA slave which is the subject of DMA transfer is selected by this DACK#.

Allocation of the DMA channels is exclusively between devices on the internal ISA bus 3 and devices on the external ISA bus 5. Each device transmits to and receives from the ISADMAC 1521 by using the DREQ and DACK# corresponding to the DMA channel allocated thereto.

Transmission and reception of the DREQ and DACK# between the external ISA bus 5 and the ISADMAC 1521, as described above, are executed, according to the DMA serial channel protocol by using one group of serial REQ# and serial GNT# signal lines. In this DMA serial channel protocol, the most recent DREQ state is transmitted from the DS-PCI/ISA bridge device 15 by a serial REQ#. This is sent to the RGM 1522. In the RGM 1522, the serial REQ# is converted to internal DREQs 0 to 7 for the ISADMAC 1521.

Further, channel information of DMA transfer indicated by the internal DACK#s 0 to 7 output from the ISADMAC 1521 is sent to the DS-PCI/ISA bridge device 15 by a serial transfer by using the serial GNT# signal line and executed by the RGM.

The ISADMAC 1521 performs 82C37 compatible arbitration between DREQ channels, according to setting and adjustment of a DREQ channel mask, based on the most recent DREQ channel information provided from the RGM 1522 and IIDR 1523. If there is an effective DMA request (DREQ), the ISADMAC 1521 first activates a REQ# allocated to itself and sends a request for bus access enable to the PCI bus arbiter (PBA) 151. The ISADMAC 1521 waits for a GNT# to be granted by the PBA.

When the GNT# is provided from the PBA 151 to the ISADMAC 1521, the ISA MAC 1521 activates an internal DACK# corresponding to a DMA channel number selected as a result of the arbitration. A DMA channel number at which DMA transfer has been executed is returned to the RGM 1522 and the IIDR 1523. The ISADMAC executes a DMA cycle corresponding to a DMA transfer mode (single transfer mode, block transfer mode, demand transfer mode, and cascade mode) regulated by setup information of a selected DMA channel. The ISADMAC 1521 supports only bus cycles of the PCI bus for both memory and I/O cycles as described previously. The bus cycles in the ISA bus are emulated by the bridge device 15 or 20.

The RGM 1522 serializes the plurality of DMA channels and manages the states of the serial REQ# and the serial GNT# in order to perform processes relating to the DMA serial channel protocol for transfer. The RGM 1522 performs conversion between the DMA serial channel protocol and the DREQ/DACK# protocol of the ISA style regarding the ISADMAC 1521.

REQ# signals are input to the RGM 1522. Also, the protocol of the REQ# is programmed for each REQ# signal. Consequently, if a number of pairs of REQ# and GNT# signal lines used as serial REQ#s and serial GNT#s are arranged, not only reception and transmission of DREQs and DACK#s between devices on the external ISA bus 5, which are performed through the DS-PCI/ISA bridge device 20, but also reception and transmission of DREQs and DACK#s between, for example, PC cards 61 and 62 of the PC card controller 17 and the ISADMAC 1521 are performed in accordance with the DMA serial channel protocol.

The RGM 1522 converts between DMA serial channel protocol and REG#/GNT protocol for arbitration of the standard PCI style supported by the PBA 151. This is described in the publication "PCI Local Bus", Revision 2.01, Oct. 20, 1994, PCI Special Interest Group, pp. 47–52. In other words, not only reception and transmission of DREQs and DACK#s with devices on the external ISA bus 5, but also reception and transmission of REQs and GNT#s with the PCI master 41 on the external PCI bus 4, are performed using the DMA serial channel protocol. Processing of the REQ#s and GNT#s in this case is performed in the following manner by the RGM 1522.

The PCI master 41 such as a LAN board or a SCSI board on the external PCI bus 4, informs the DS-PCI/ISA bridge device 20 of a bus access request by activating the REQ#. The DS-PCI/ISA bridge device 20 informs the RGM 1522 of the bus access request by serial data transfer by using the serial REQ#. In such a case, notification of the bus access request uses DREQ 4 which is the DMA channel not used by an ISA device.

The RGM 1522 serial-to-parallel converts the serial REQ# signal and, upon detecting that the DREQ 4 has been notified by the serial REQ#, activates the REQ# and makes a request to the PBA 151 for bus access. The PBA 151 arbitrates using the standard PCI rule and enables bus access for the RGM 1522 by means of a GNT#.

The RGM 1522, upon receiving the GNT# from the PBA 151, notifies the DS-PCI/ISA bridge device 20 by means of serial transfer data using a serial GNT# to indicate that bus access was enabled. The DACK 4 is used in this notification. The DS-PCI/ISA bridge device 20 serial-to-parallel converts the serial GNT# signal transmitted by the RGM 1522 and supplies the GNT# to the PCI master 41. The PCI master 41 commences a bus cycle upon receiving the GNT#.

Next, the internal ISA DMA router (IIDR) 1523 is explained.

The internal ISA DMA router (IIDR) 1523 changes a mapped DMA channel to the DMA slaves 31, 32, . . . on the internal ISA bus 3, according to programmed mapping information. The IIDR 1523 converts the states of DREQ signals from the DMA slaves 31, 32, . . . to internal DREQs corresponding to the DMA channel numbers of these devices, according to mapping information, and sends the internal DREQs to the ISADMAC 1521. Further, the IIDR 1523 converts internal DACK#s from the ISADMAC 1523 to DACK#s, which are actually used by the DMA slaves, according to mapping information, and outputs them to the internal ISA bus 3.

The internal ISA bus bridge (IIBB) 153 is a bridge LSI for connecting the internal PCI bus 2 and the internal ISA bus 3, and controls all devices on the internal ISA bus 3 such as memories, I/Os. The IIBB 153 protocol converts memory or I/O cycles generated on the internal PCI bus 2 for DMA transfer by the ISADMAC 1521, and sends them to the internal ISA bus 3.

The PCI-DS bridge device 18 is a bridge LSI for connecting the internal PCI bus 2 and a desk bus corresponding to the PCI bus leading out to a desk station, and functions as an agent on the internal PCI bus 2. A buffer for synchronizing transfer of serial REQ#s/GNT#s by means of DMA serial channel protocol is provided in the PCI-DS bridge device 18.

The PC card controller 17 is one of the PCI bus masters and supports DMA serial channel protocol. When PC cards controlled by the PC card controller 17 request DMA transfer, this DMA request, i.e., DREQ, is transferred to the RGM 1522 by the serial transfer which uses the REQ# signal line allocated to the PC card controller 17. Further, a DACK# from the RGM 1522 is sent to the PC card controller 17 by serial transfer, which uses the GNT# signal line allocated to the PC card controller 17. The serial GNT# is serial-to-parallel converted into a DACK# by the PC card controller 17 and passed along to the PC card 61 or 62.

The PCI DMA 18 is an agent on the internal PCI bus 2 similar to the PC card controller 17 and supports DMA serial channel protocol. When a DMA slave 19 controlled by the PCI DMA 18 requests DMA transfer, this DMA request, i.e., DREQ, is transmitted to the RGM 1522 by a serial REQ#. Also, a serial GNT# from the RGM is serial-to-parallel converted into a DACK# by the PCI DMA 18 and provided to the DMA slave.

The DS-PCI/ISA bridge device 20 is a bridge LSI for connecting the desk bus (operating with internal PCI bus 2), leading out to the desk station from the main body of the computer via the DS connector, to the external PCI bus 4 and the external ISA bus 5.

The DS-PCI/ISA bridge device 20 is a PCI master similar to the PC card controller 17 and supports DMA serial channel protocol.

The DS-PCI/ISA bridge device 20 includes an external PCI bus bridge (EPBB) 201, an external ISA bus bridge (EIBB) 202, a local bus arbiter (LBA) 203 and an external ISA DMA router (EIDR) 204.

The EPBB 201 receives through the PCI-DS bridge device 16 memory cycles and I/O cycles generated by the ISADMAC 1521 on the internal PCI bus 2, and sends them to the external PCI bus 4. Further, where a bus access enable is granted to the PCI master device 41 on the external PCI bus 4, the EPBB 201 generates an external PCI bus transaction on the desk station 6.

The EIBB 202 receives through the PCI-DS bridge device 16 memory cycles and I/O cycles generated by the ISADMAC 1521 on the internal PCI bus 2, protocol-converts them, and sends them to the external ISA bus 5. Further, where a bus access enable is granted to the ISA master device 51 on the external ISA bus 5, the EIBB 202 generates an external ISA bus transaction on the desk station 6.

Figure 5:
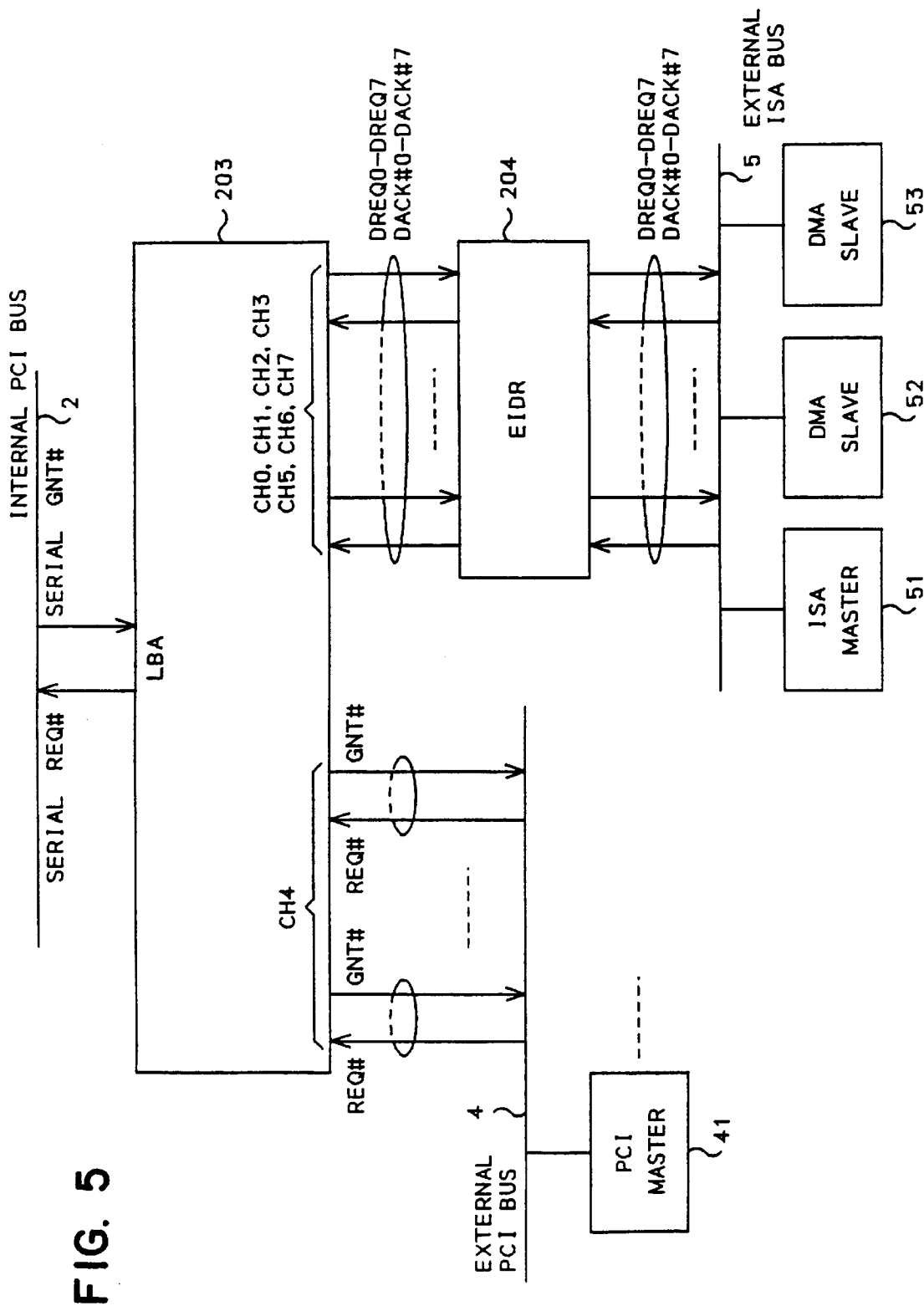
FIG. 5 is a block diagram of a DS-PCI/ISA bridge device in the system of FIG. 3.

The LBA 203 and the EIDR 204 are provided to support DMA serial channel protocol, and details of their connections are illustrated in FIG. 5.

The LBA 203 monitors changes in the states of bus access requests REQ# from the PCI bus master 41 on the external PCI bus 4 and DREQ signals (basically of the amount of ISA DMA channels) from the ISA master 51 on the external ISA bus 5 and the DMA slaves, and sends the most recent state through the PCI-DS bridge device 16 by serial transfer of a bit string by using a serial REQ# to the RGM 1522.

The format of the bit string transmitted by a serial REQ# is as follows:

| Channel Nos. | s 0 1 2 3 4 5 6 7 |
|---|---|
| REQ #203 | H,H,H,L,H,L,H,L,H,L,H,L,L |

The LBA 203 takes the leading edge of the activated REQ# as the start bit (S), thereafter using DMA channels 0 to 7 per each clock frame and sending them in series. The frame of channel 4 is used to send changes in the bus request state of the PCI master 41, while all other channels are used to send changes in the states of DMA requests of the ISA master 51 and the DMA slaves 52, 53, . . . on the external ISA bus 5.

In each frame, a DMA request is being made if the start bit "S" is "L". Then, after the start bit "S", "L" is taken to mean that there is no request and "H" is taken to mean that there is a request. In the above example, DREQs 0, 2 and 7 are active and correspond to a state in which the PCI master 41 on the external PCI bus 4 is requesting bus access (DREQ 4 is active).

The LBA 203 has two operating states (proceed and freeze). Until the LBA 203 receives a serial GNT# from the RGM 1522, the LBA 203 is in a proceed state and works to continuously send the most recent state to the RGM 1522. In other words, in a proceed state, whenever a change in the state of a REQ# of the PCI bus master 41 on the external PCI bus 4 or DREQs of the ISA master 51 and DMA slaves 52, 53, . . . on the external ISA bus 5 is generated, the RGM 1522 is notified by DMA serial channel protocol.

When a serial GNT# is received from the RGM 1522, the LBA 203 decodes the bit string including the serial GNT# and either returns a DACK# to the EIDR or returns a GNT# on the external PCI bus 4.

The format of the bit string transmitted by the serial GNT# from the RGM 1522 is as follows.

| Channel Nos. | s 0 1 2 3 |
|---|---|
| GNT # | H,H,H,L,H,L,L,L,L, |

The RGM 1522 takes the leading edge of the activated GNT# as the start bit (S). After the start bit (S), "H" is considered active, i.e., positive logic. After the start bit (S), the RGM 1522 allocates, one bit per one clock frame, in sequence from the LSB, 3-bit coded information from one of the DMA channel DACK#s 0 to 7, and sends it in series. The code of channel 4 is used to send a GNT# corresponding to a bus request state of the PCI master 41 on the external PCI bus 4, while all other codes are used to send DACK#s corresponding to DMA requests of the ISA master 51 and the DMA slaves 52, 53, . . . on the external ISA bus 5.

The above example means that DMA channel 1, which is channel code=1, was selected (DACK1# was supplied).

Upon receiving a GNT#, the operating state of the LBA 203 is switched from a proceed state to a freeze state. The freeze state is maintained until the device (PCI master, ISA master or DMA slave) corresponding to the GNT# withdraws its bus access request. During the freeze state, execution of serial REQ# cycles for reporting such operating states are frozen, even if changes in the states of other devices occur, and REQ#s continue to be maintained in active states.

The freeze state is an operating state that is provided to prevent the deficiency of a serial REQ# being rendered active during execution of a DMA cycle, and is described in detail below, referring to FIG. 6 and FIG. 7.

In the DMA serial channel protocol of this system, the frame allocated by the use of the PCI master 41 is channel 4 only, as a result of which in a case where a plurality of PCI masters exist on the external PCI bus 4, arbitration between REQ#s from the plurality of PCI masters is performed by the LBA.

The EIDR 204 changes mapped DMA channels into the ISA master 51 and DMA slaves 52, 53 . . . on the external ISA bus 5, according to programmed mapping information. By the cooperation of the EIDR 204 and the previously described IIDR 1523, DMA channels can be exclusively allocated to devices on the internal ISA bus 3 and devices on the external ISA bus 5.

The EIDR 204 changes the state of DREQ signals from each of the ISA master 51 and the DMA slaves 52, 53, . . . to DREQ signals corresponding to the DMA channel numbers of these devices, according to mapping information and sends them to the LBA 203. Further, the EIDR 204 changes DACK#s from the LBA 203 into DACK#s actually used by the ISA master 51 and the DMA slaves 52, 53 . . . , according to mapping information, and outputs them to the external ISA bus 5.

Next, the flow of the DMA transfer process executed by the ISADMAC 1521 is explained.

(1) DREQ Arrangement of ISA Interchange

The ISADMAC 1521 receives an ISA compatible DREQ signal from the IIDR 1523 and the RGM 1522. Based on this, it performs arbitration, and determines whether an effective (unmasked) DMA request exists and to which DMA channel the DACK# is to be returned.

(2) Generation of Internal PCI Bus Access Request

If there is an effective DMA request, the ISADMAC 1521 generates a REQ# to the PBA 151. However, at this time, the DMA channel for granting the DACK# is not determined. Further, when the internal PCI bus 2 is in a locked state, generation of REQ#s is suppressed.

(3) Acquisition of Internal PCI Bus Access Enable

The ISADMAC 1521, upon acquiring a GNT# from the PBA 151, continues to output a bus access request REQ# until all necessary DMA transfer is completed. Normally, PCI bus cycles are generated a number of times. The ISADMAC 1521 does not disconnect the bus access during transfer, even if the bus cycle finishes due to a target retry.

At this time, the lock state of the internal PCI bus is checked again. If the internal PCI bus 2 is locked, the REQ# is rendered inactive and the GNT# is ineffective.

(4) Assertion of DACK#

The ISADMAC 1521, at the point where a GNT# is acquired, determines the DMA channel for granting the DACK#. The DACK# is returned to the RGM 1522 and the IIDR 1523. At the time when the DACK# is activated, the DMA channel is fixed.

(5) Generation and Repetition of Bus Cycles

The ISADMAC 1521 generates a bus cycle on the internal PCI bus 2 from the time when the DACK# is asserted. However, when the selected DMA channel has been programmed in cascade mode, a bus cycle is not generated.

The types of bus cycle are classified as three types: write transfer, read transfer and verify transfer by the content (transfer type) of a mode register of the selected DMA channel.

Write transfer (I/O read→memory write) is executed by taking the following two bus cycles as one group and repeating them the necessary number of times:

DMA-exclusive I/O cycle (read)

memory write cycle

The DMA-exclusive I/O cycle (read) is the same as the I/O read cycle of a standard PCI bus. However, the I/O address has a special meaning.

The I/O address is either one of:

00000000h: no TC

00000004h: TC exists, where TC is a signal indicating the end of the transfer count value, i.e., transfer completion. These addresses are allocated to 82C37 (DMAC), and no target other than the ISADMAC corresponds thereto.

The agent which is an I/O target is all bridges having paths which have received a DACK#. For example, in the case a DACK# has been granted to a DMA slave on the external ISA bus 5 by means of a serial GNT#, the PCI-DS bridge device 16 and the EIBB 202 of the DS-PCI/ISA bridge device 20 correspond thereto.

The PCI-DS bridge 16 outputs a command (IOR#) on the external ISA bus 5. When the address specifies TC (00000004h), a TC is output to the external ISA bus 5. At this time, a DACK# has already been output by the EIDR 204. Consequently, on the external ISA bus 5, read data is output from a DMA slave selected by the DACK#. The PCI-DS bridge 16 sends this data from the external ISA bus 5 to the internal PCI bus 2.

The read data is latched by the ISADMAC 1521. This data is used as write data in the memory write cycle generated by the ISADMAC 1521 immediately afterward.

The memory write cycle is the same as the memory write cycle of a standard PCI bus.

A memory address is created from a current address register and a page register incorporated in the ISADMAC 1521. Write data latched by the DMA-exclusive I/O cycle (write) generated by the ISADMAC 1521 immediately prior thereto is used. In a single transfer, one byte (8 bit DMA) or two bytes (16 bit DMA) is/are generated.

The host/PCI bridge device 12, which is one target, receives the memory write data from the standard PCI master, and write accesses the system memory. Even where finished due to a retry, the ISADMAC 1521 regenerates the same memory cycle after placing it on standby for a short time. During this time, the ISADMAC 1521 does not release the internal PCI bus 2.

(Proceed and freeze)

Next, the previously described proceed and freeze operating states are specifically explained.

Figure 6:
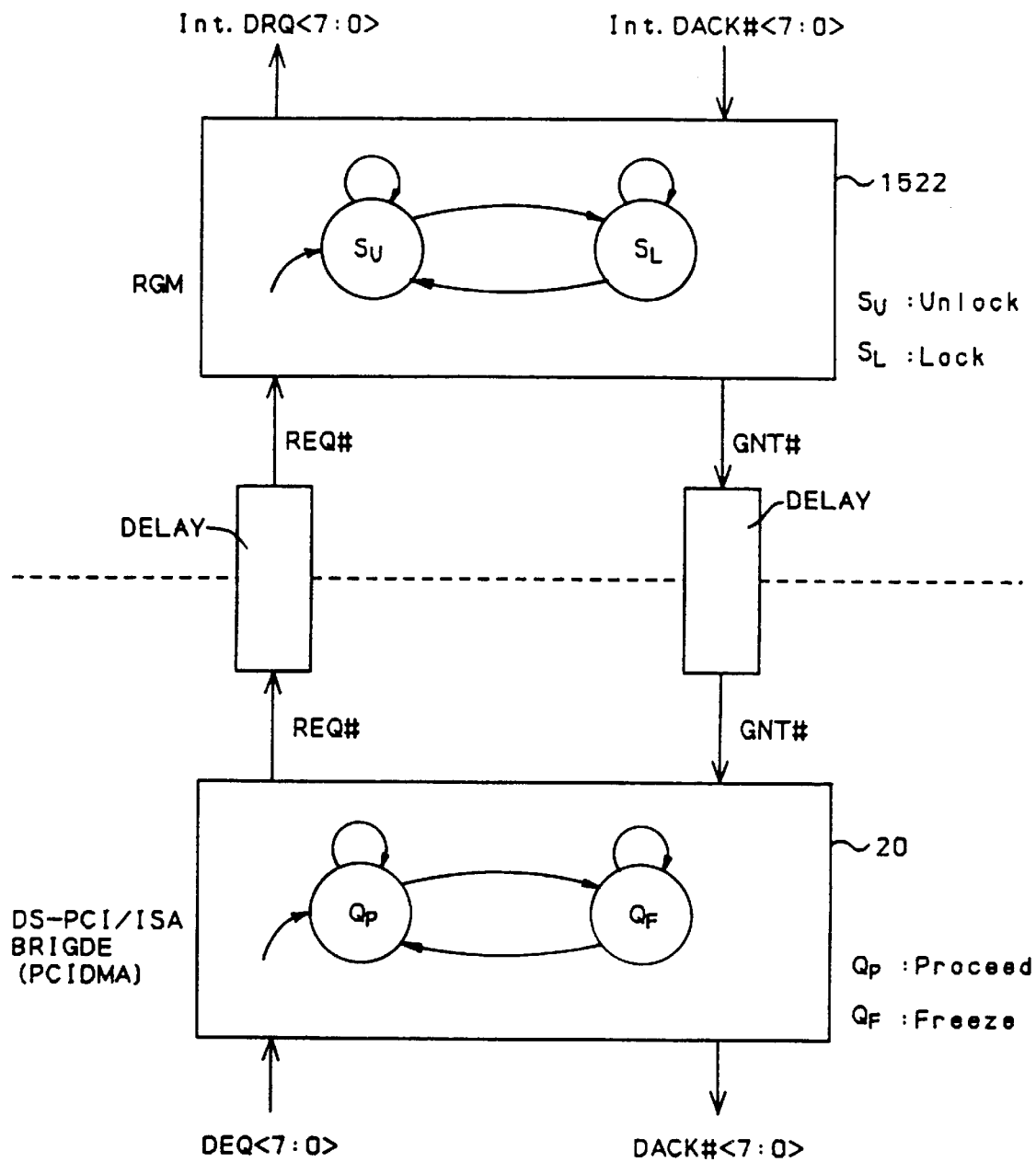
FIG. 6 illustrates an operating relationship between the DMAC core of FIG. 4 and the DS-PCI/ISA bridge device of FIG. 5.

FIG. 6 illustrates the relationships of operating states of the DS-PCI/ISA bridge device 20 and the RGM 1522.

The state of the DREQ output by the ISA master 51 and the DMA slaves 52, 53, . . . on the external ISA bus 5 is sent as an internal DREQ input to the ISADMAC 1521 through a parallel-serial conversion delay executed by the LBA 203 in the DS-PCI/ISA bridge device 20, a serial-parallel conversion delay executed by the RGM 1522, and a slight synchronization delay. Midway therethrough, the DREQ output state is temporarily substituted for a REQ# signal for serial transfer.

Similarly, the state of the DACK# output by the ISAD-MAC 1521 is sent as a DACK# to the ISA master 51 and the DMA slaves 52, 53, . . . on the external ISA bus 5 through a parallel-serial conversion delay executed by the RGM 1522, a serial-parallel conversion delay executed by the LBA 203 in the DS-PCI/ISA bridge device 20, and a slight synchronization delay. Midway therethrough, the DACK# output state is temporarily substituted for a GNT# signal for serial transfer.

The origin of requests is the same as for a PCI bus master on the external PCI bus 4, and may be understood by substituting the PCI master 41 for the DMA slaves, 52, 53, . . . and ISA master 51 and substituting the PBA 151 for the ISADMAC 1521 in the above explanation.

The LBA 203 in the DS-PCI/ISA bridge device 20 works to send the most recent state of all of its shared DREQ signals and REQ# signals to the RGM 1522 before a DACK# of the DMA slaves or the ISA master or a GNT# of the PCI master 41 is granted by the serial GNT# from the RGM 1522. This state is called the proceed state (QP). When in the proceed state, the LBA 203 temporarily renders the activated serial REQ# signal inactive, and can retransmit the serial REQ# from the start bit.

The LBA 203 is granted a DACK# of the DMA slaves and the ISA master 51 or a GNT# of the PCI master 41 by the serial GNT# from the RGM 1522. Thereafter, the LBA 203 continues to render the serial REQ# signal active until the DREQ signal or REQ# signal corresponding to the channel specified by the serial GNT# is rendered inactive. This state is called the freeze state (QF).

In the freeze state, the LBA 203 can render inactive a serial REQ# signal in the active state, only when a DREQ signal or a REQ# signal specified by the serial GNT# has been rendered inactive. Further, strictly speaking, this is also possible when resetting. In a freeze state, deasserting the REQ# and retransmitting the serial REQ# from the start bit for the purpose of updating the states of DREQ signals and REQ# signals cannot be done.

Figure 7:
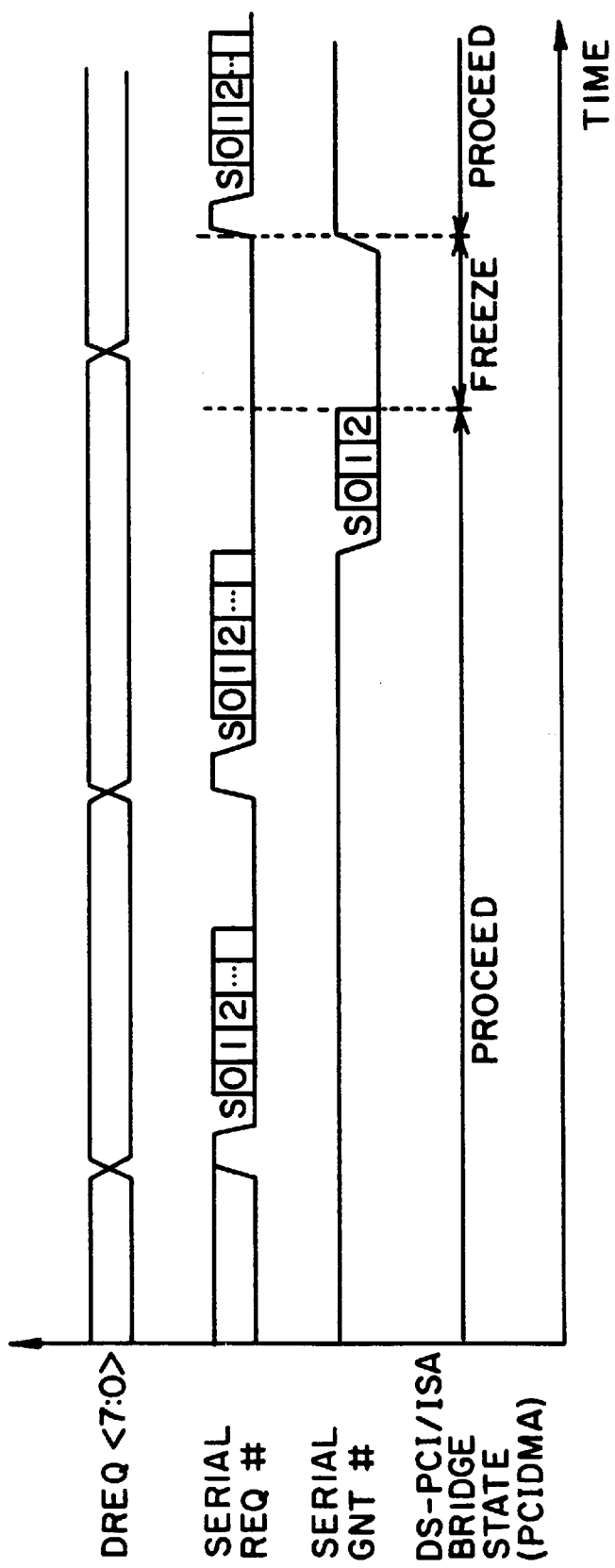
FIG. 7 is a timing chart illustrating two operating states in the DS-PCI/ISA bridge device of FIG. 5.

Consequently, as shown in the timing chart of FIG. 7, when a DACK# is received by means of the serial GNT#, the operating state of the LBA 203 is switched from proceed to freeze. In the freeze state, execution of a serial REQ# cycle is only enabled when a change to a DMA request state of an I/O device which the DACK# has notified, i.e., an I/O device in the process of executing a DMA cycle, has been generated. All execution of serial REQ# cycles for other purposes are frozen.

Thus, after a DACK# has been sent by the serial GNT#, unless the DMA request of the I/O device in the process of executing a DMA cycle becomes inactive, retransmission using the serial REQ# cannot be performed even if a change in the state of a DMA request relating to another I,O device has occurred. Consequently, the deficiency of the serial REQ# being rendered inactive during a DMA cycle for retransmission is eliminated and it is possible to correctly perform DMA transfer.

Corresponding to the two states of proceed and freeze of the DS-PCI/ISA bridge device 20, two states of unlock (SU) and lock (SL) of the RGM 1522 are preferably provided.

Before the RGM 1522 sends a DACK# to the DMA slaves and the ISA master 51 or a GNT# to the PCI master 41, it holds a DREQ to be sent to the ISADMAC 1521 or a REQ# to be sent to the PBA 151. In this case, even when the serial REQ# is inactive, the DREQ to be sent to the ISADMAC 1521 or the REQ# to be sent to the PBA 151 is not rendered inactive. When the most recent states of the DREQ and the REQ# are updated by the serial REQ# from the LBA 203, the result thereof is reflected after serial-parallel conversion. In this way, an inactive state of the serial REQ# does not mean an inactive state of a specific DREQ or REQ#. This state is called the unlock state (SU).

When the 1522 RGM sends a DACK# to the DMA slaves 52, 53, . . . or ISA master 51, or a GNT# to the PCI master 41 by means of the serial GNT#, thereafter it is "locked" with respect to a DREQ or REQ# corresponding to channels specified by the serial GNT#. Therefore, "locked" means channel lock. When a serial REQ# output from the LBA 203 has been rendered inactive, among the DREQ to be sent to the ISA MAC 1521 or the REQ# to be sent to the PBA 151, only those which are locked are rendered inactive. An inactive state of the serial REQ# means an inactive state of a specific DREQ or REQ#. This state is called the lock state (SL).

Normally, the proceed state on the LBA 203 and the unlock state on the RGM 1522 correspond, and the freeze state on the LBA 203 and the lock state on the RGM 1522 correspond (QP and SU, and QF and SL).

In summary, the bus master for controlling I/O devices has proceed and freeze operating modes. When the bus master receives DMA acknowledgment (DACK#) regarding a predetermined I/O device by means of serial transfer utilizing the bus access enable signal (GNT#), it switches from proceed mode to freeze mode.

In the freeze mode, a serial transfer cycle utilizing the bus access request signal (REQ#) is executed only when a change occurs in the state of a DREQ of the I/O device regarding which DMA acknowledgment (DACK#) has been given, i.e., the I/O device which is executing a DMA cycle, and execution of serial transfer cycles for notification of state changes of DREQs relating to other I/O devices is frozen.

As a result, after DMA acknowledgment (DACK#) is given by serial transfer utilizing the bus access enable signal (GNT#), retransmission utilizing the bus access request signal (REQ#) is not executed even if changes occur in the state of a DREQ relating to other I/O devices. However, the DREQ of an I/O device in the process of DMA cycle execution is not rendered inactive. Consequently, the disadvantage of a bus access request signal (REQ#) for retransmission being rendered inactive during DMA cycle execution is eliminated, and it is possible to correctly perform DMA transfer.

The operating states shown in FIG. 7 are also entered during processing of DMA requests from the DMA slave 19 to the PCI DMA 18.

(1T Rule)

Figure 8A:
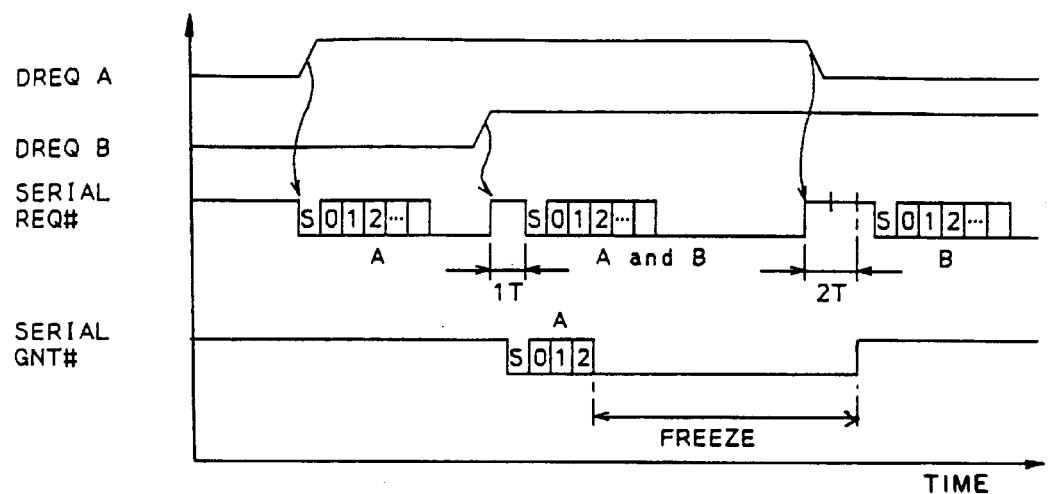
FIG. 8(A) and FIG. 8(B) are timing charts illustrating a 1T rule regulated between the DMAC core of FIG. 4 and the DS-PCI/ISA bridge device of FIG. 5.
Figure 8B:
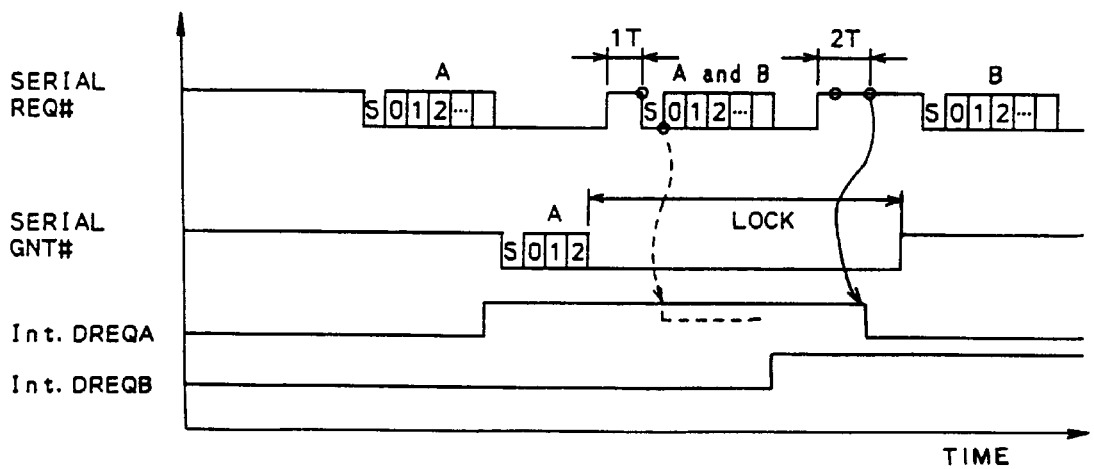

Next, a serial REQ# transmission rule (1T rule) regulated between the LBA 203 and the RGM 1522, for solving deficiencies which occur due to using DMA serial channel protocol is explained, referring to FIGS. 8(A) and 8(B).

The serial REQ# transmission rule (1T rule) is as follows.

(1) When a serial REQ# is rendered inactive for the purpose of retransmission, the inactive time of the serial REQ# (serial REQ#=H) is made a width of 1T.

(2) When a DREQ inactive or REQ# inactive of a frozen channel is sent (i.e., a DREQ inactive by an ISA master or DMA slave which has received a DACK#, or a REQ# inactive by a PCI master which has received a GNT# is sent), the inactive time of the serial REQ# (serial REQ#=H) is made a width of 2T. In FIGS. 8(A) and 8(B), the duration of 2T is two times the duration of 1T.

By employing this 1T rule, it is possible to discriminate case (1) and case (2) at the RGM 1522 which has received a serial REQ#. In other words, if REQ#=L again immediately after changing from REQ#=L to H (H for 1T only), this can be discriminated as a start for retransmission.

Figure 1:
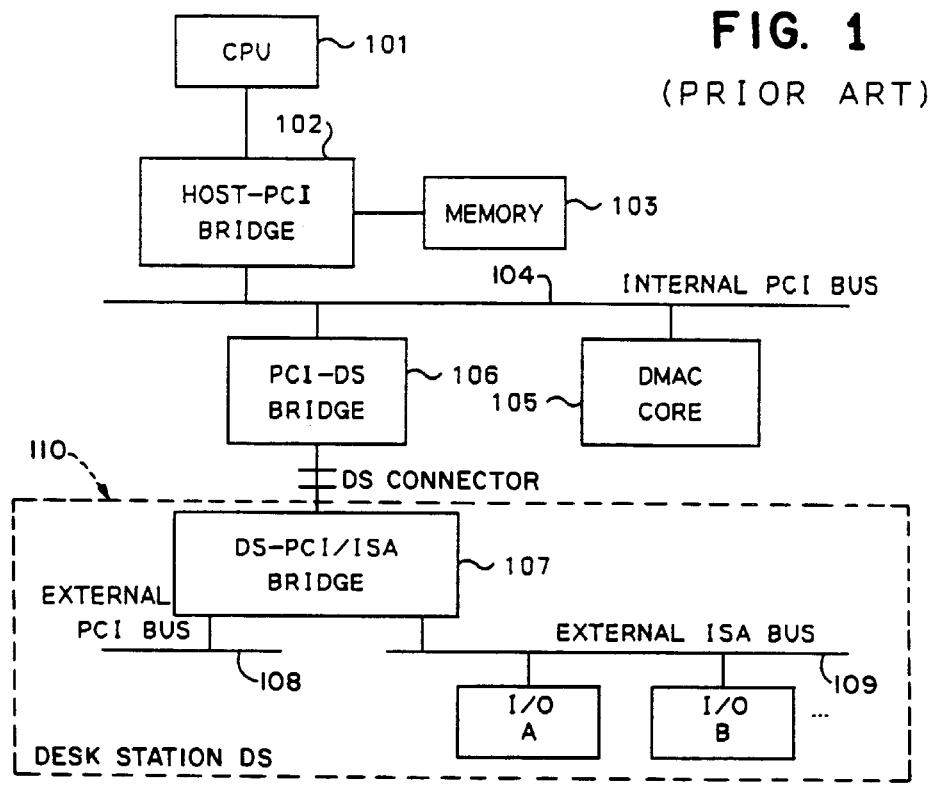
FIG. 1 is a block diagram of a conventional portable computer which utilizes a DMA serial channel protocol.
Figure 2:
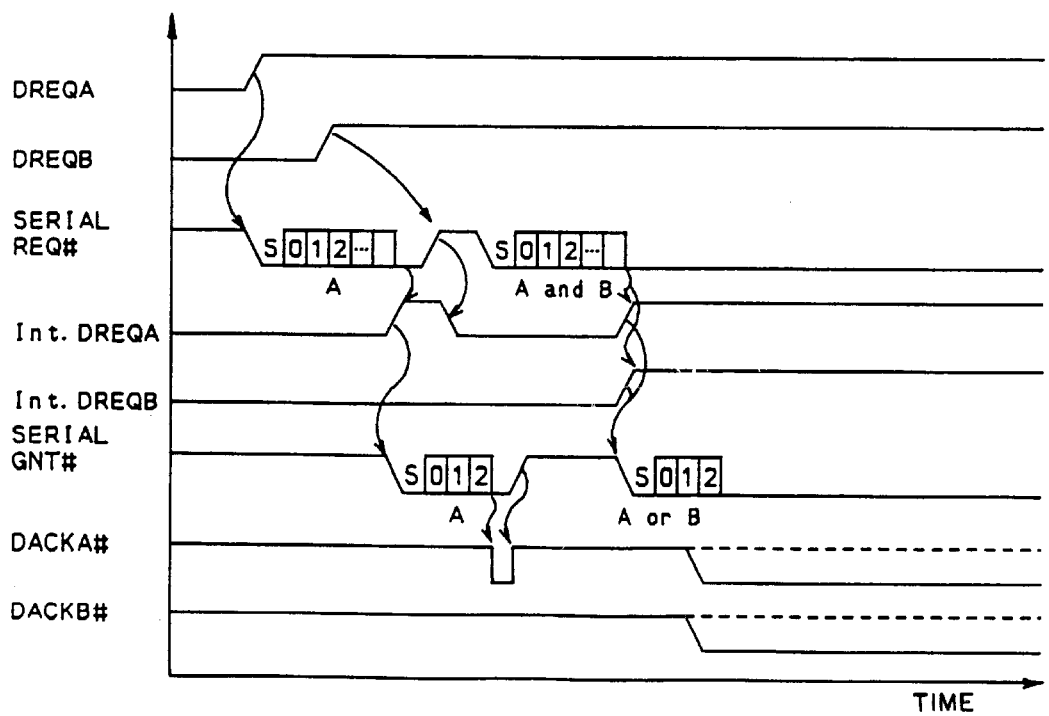
FIG. 2 is a timing chart illustrating a conventional DMA serial channel protocol practiced on the portable computer shown in FIG. 1.

Therefore, even if the serial REQ# goes inactive for the purpose of retransmission of a DREQ from an I/O device or a REQ# from the PCI master 41 during execution of a DMA cycle, misjudgment of this as the I/O device rendering the DREQ inactive or the bus releasing during execution of a DMA cycle is eliminated. Thus, the problem explained with reference to FIG. 2, i.e., the deficiency that a DACK# which becomes inactive in response to an I/O device which has issued a DREQ, is prevented.

Further, by employing this 1T rule, even if the corresponding relationships of QP and QF on the DS-PCI/ISA bridge device 20 and SU and SL on the RGM 1522 are not maintained, deficiencies due to this are prevented. Specifically, when an SL state is generated although there is a QP state, misoperation occurs. An SL state in a QP state occurs in the following cases.

Where the RGM 1522 activates the serial GNT#, time is required to serial/parallel convert a DACK# or GNT# at the DS-PCI/ISA bridge device 20. During that time, there is the possibility that the DS-PCI/ISA bridge device 20 may render the serial REQ# inactive for the purpose of retransmission. This is not because the LBA 203 in the DS-PCI/ISA bridge device 20 is still in the freeze state, but because it is in the proceed state.

At this time, the RGM 1522 shifts from the unlock state to the lock state, and the inactive state of the serial REQ# is processed as a DREQ inactive or REQ# inactive of the locked channel. In other words, either the internal DREQ with respect to the ISA MAC 1521 or the REQ# with respect to the PBA 151 is inactive.

This phenomenon occurs due to generation of one type of combination of illegal states known as "QP but SL". This combination occurs because of a time delay in sending the serial GNT# from the RGM 1522 to the DS-PCI/ISA bridge device 20. This time delay inherently occurs only when the RGM 1522 and the LBA 203 exist on separate chips.

Further, immediately thereafter, the serial GNT# transmitted from the RGM 1522 arrives at the LBA 203, and the operating state of the LBA 203 becomes QF. The LBA 203 sends the serial GNT# as a DACK# or GNT# to the DMA slave, ISA master 51 or PCI master 41 which is the origin of the request.

As a result, the DMA slave, ISA master 51 or PCI master 41 is now in a state where it has just commenced operation. On the other hand, because the RGM 1522 has already rendered the DREQ with respect to the ISADMAC 1521 inactive, or the REQ# with respect to the PBA 151 inactive, the computer system falls into a state where it cannot operate.

This type of problem is prevented by the 1T rule.

Next, the DS-PCI/ISA bridge device 20 operation (FIG. 8(A)) and the RGM 1522 operation (FIG. 8(B)) are specifically explained in the case where the 1T rule is employed, referring to the timing charts of FIGS. 8(A) and 8(B).

The timing charts of FIGS. 8(A) and 8(B) show states in consideration of the time delays of the DS-PCI/ISA bridge device 20 operation and the RGM 1522 operation, respectively.

First, the DMA slave 52 on the external ISA bus 5 activates a DREQ. The state of the DREQ is sent to the LBA 203 through the EIDR 204 as the active state of DREQ A as shown in FIG. 8(A). The LBA 203 performs serial transfer of a bit string by using the serial REQ#, and transmits the DREQ A to the RGM 1522. In this case, the bit string continuing after the start bit S of the serial REQ# indicates that the DMA channel A (a predetermined channel among the DMA channels 0 to 7 with the exception of channel 4) has been rendered active.

Upon receiving the serial REQ#, as shown in FIG. 8(B), the RGM serial-to-parallel converts the serial REQ# and generates an internal DREQ A signal (Int. DREQ A) to the ISADMAC 1521.

The ISADMAC 1521 renders the REQ# to the PBA 151 active if the internal DREQ A is an effective DMA request, and requests bus access. The PBA 151 performs arbitration, according to the standard PCI arbitration protocol. By rendering the GNT# active, bus access is enabled with respect to the ISADMAC 1521. Thereafter, the GNT# continues to be active until the REQ# is rendered inactive.

The ISADMAC 1521, upon receiving the GNT# from the PBA 151, activates the internal DACK# A. The RGM 1522 checks whether the DACK# A from the ISADMAC 1521 corresponds to the DREQ A which it has output itself Where it does correspond, the RGM 1522 executes serial transfer of the bit string by using the serial GNT# signal as shown in FIG. 8(B), and sends the DACK# A to the LBA 203. Further, at this time, the RGM 1522 enters a lock (SL) state.

Before the serial GNT# arrives, upon the DMA slave 53 on the external ISA bus 5 rendering the DREQ active, the state of this DREQ is sent to the LBA 203 through the EIDR 204 as an active state of the DREQ B, as shown in FIG. 8(A). In this case, since the LBA 203 is still in a proceed (QP) state, serial transfer of the bit string is performed by using the serial REQ#, as shown in FIG. 8(A). The DREQ A and the DREQ B are retransmitted to the RGM 1522. In this case, since the serial transfer executed is a serial REQ# for the purpose of retransmission of the DREQ A, the inactive time period of the serial REQ# is set to 1T as shown in FIG. 8(A). Further, the bit string following on from the start bit S of the serial REQ# indicates that both DMA channels A and B have been rendered active.

This serial REQ# arrives at the locked RGM 1522, as shown in FIG. 8(B). The RGM 1522, because the inactive time period of the transmitted serial REQ# is 1T, recognizes that this serial REQ# has been sent for the purpose of retransmission. Consequently, there is no erroneous setting to inactive of the internal DREQ A which is in an active state, and as shown in FIG. 8(B) only the internal DREQ B is changed to an active state.

When the LBA 203 receives the serial GNT# transmitted by the RGM 1522, it serial-to-parallel converts it and returns the DACK# A to the DMA slave 52 through the EIDR 204. The LBA 203 enters a freeze state as shown in FIG. 8(A).

During the time period when the LBA 203 is in a freeze state, upon the DREQ A from the DMA slave 52 being changed to inactive as shown in FIG. 8(A), the LBA 203 performs serial transfer of a bit string by using the serial REQ#. In this case, since the serial transfer executed here is a serial REQ# whose purpose is notification of the change of the DREQ A to inactive, the inactive time period of this serial REQ# is set at 2T or more. Further, the bit string following on from the start bit S of the serial REQ# indicates that what is currently active is the DMA channel B only.

This serial REQ# arrives at the locked RGM 1522, and the RGM 1522 recognizes that the locked DREQ A is inactive, since the inactive time period of the received serial REQ# is 2T or more and renders the internal DREQ A inactive as shown in FIG. 8(B).

In summary, according to the length of the inactive time period of the bus access request signal, the DMA controller is notified whether or not the initial serial transfer cycle is a cycle for notifying that the DMA request from an I/O device for which notification of DMA cycle execution has been given is inactive. As a result, even if the bus access request signal is rendered inactive for the purpose of retransmitting the DMA request, misjudgments are eliminated if the I/O device in the process of DMA cycle execution renders the DMA request inactive, or the bus is disengaged. Thus, the disadvantage that the DMA acknowledgment regarding the I/O device issuing the DMA request disappears is prevented.

The above-described operation of the 1T rule is also applicable to DMA requests by the DMA slave 18 to the PCI DMA 18. Thus, for example, the DREQ A or DREQ B signals of FIG. 8(A) could be generated by one of the DMA slaves 19.

(Four-bit conversion of the serial GNT#)

Next, a four-bit conversion technique of the serial GNT# in order to execute at high speed the switching of bus direction is explained.

When a serial GNT# is returned from the RGM 1522 to the LBA 203 through the PCI-DS bridge 16 and the DS-PCI/ISA bridge 20, where the point at which the DACK# arrives last is the DMA slave on the external ISA bus 5 and where the ISA master 51 is on the external bus, the generated bus cycle thereafter differs greatly.

In the case in which a DACK# is granted to the DMA slave on the external ISA bus 5, the ISA MAC generates a bus cycle on the internal PCI bus 2, and this is sent to the external buses of the system, so that it is received by the DMA slaves on the external ISA bus 5.

Alternatively, in a case in which a DACK# is granted to the ISA master 51 on the external ISA bus 5, the ISA master 51 generates a bus cycle on the external ISA bus 5. This is sent to the internal PCI bus 2, whereafter it is also sent to the necessary buses, i.e., any bus to which a target is connected. When the ISA master 51 operates, the bus direction resembles the bus direction when the PCI master 41 operates.

The PCI-DS bridge 16 and the DS-PCI/ISA bridge 20 on the path which receives the serial GNT# can discern the channel number encoded by the serial GNT#. Since they can discern if this channel number is 4, the PCI master 41 will operate, but direction control to meet this is possible.

Where the channel number is other than 4, this is a DACK# to the DMA slaves or the ISA master 51 on the external ISA bus 5. At this time, it cannot be determined whether the device to which the DACK# is granted is a DMA slave or the ISA master 51 solely by the code information of the serial GNT#. Consequently, bus direction control cannot be performed.

In either case, since the ISADMAC 1521 generates a bus cycle on the internal PCI bus 2 or the ISA master 51 on the external ISA bus 5 activates a MASTER# signal on the external ISA bus 5, at that time determination is possible.

A problem that can occur during the time up until then, is that the bus direction cannot be determined and a floating state on the internal PCI bus 2 continues.

In order to avoid this floating state, in the present embodiment of the invention, a method of increasing the serial GNT# from 3 bits to 4 bits is employed.

Figure 9:
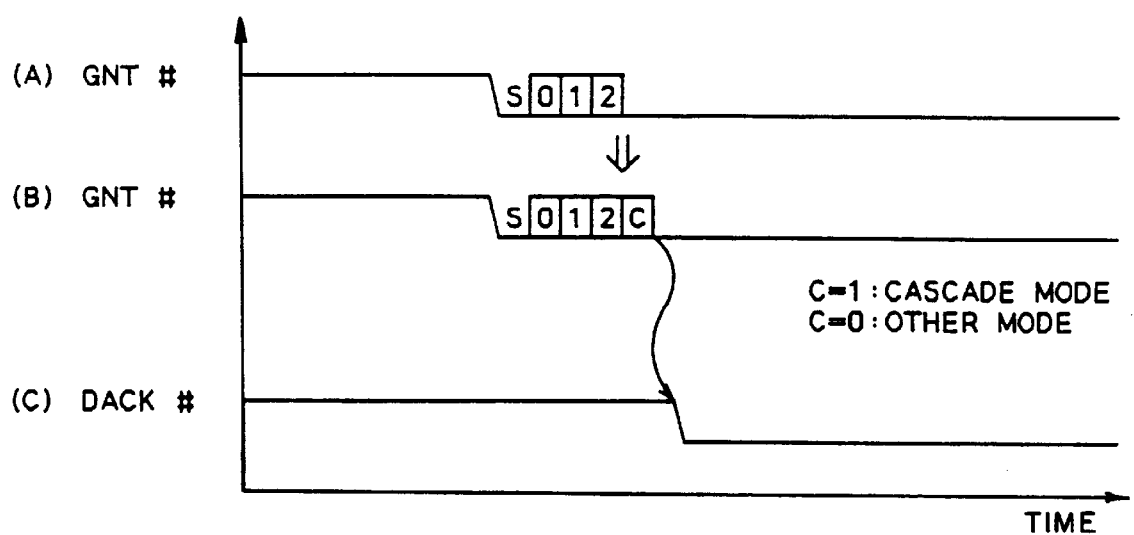
FIG. 9 is a timing chart illustrating a state in which a serial GNT# sent from the DMAC core of FIG. 4 to the DS-PCI/ISA bridge device of FIG. 5 is made a 4-bit signal.

This method, as shown in FIG. 9, is one in which the fourth bit of the serial GNT# indicates information as to whether the DMA channel specified by the DACK# at that time is programmed for cascade mode or not. The fourth bit of the bit string transmitted by the serial GNT# is taken as cascade mode, when bit C="H" and another mode (single, block or demand mode) when C="L."

The RGM 1522 also receives in combination information on whether the channel from the ISADMAC 1521 is programmed for cascade mode or not, when the internal DACK# is sent from the ISADMAC 1521 to the LBA 203 by means of the serial GNT#. The RGM 1522 controls the fourth bit of the serial GNT#, based on this information.

Figure 10A:
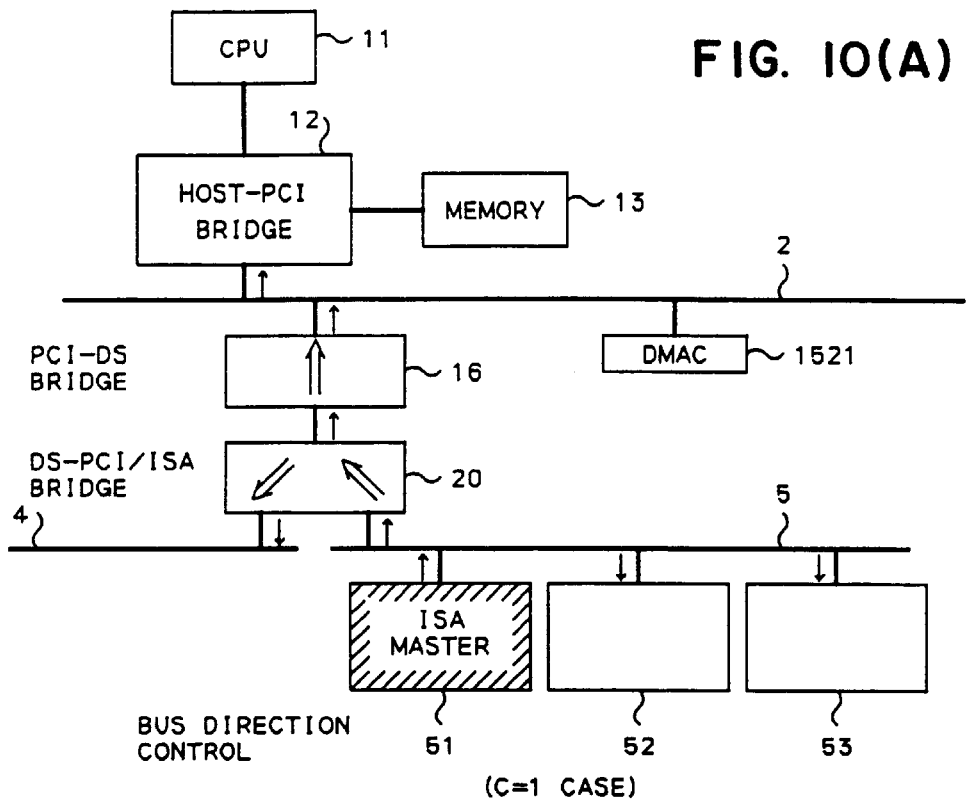
FIG. 10(A) and FIG. 10(B) are block diagrams to explain a bus direction switching operation performed by using fourth bit information of the serial GNT# of FIG. 9.
Figure 10B:
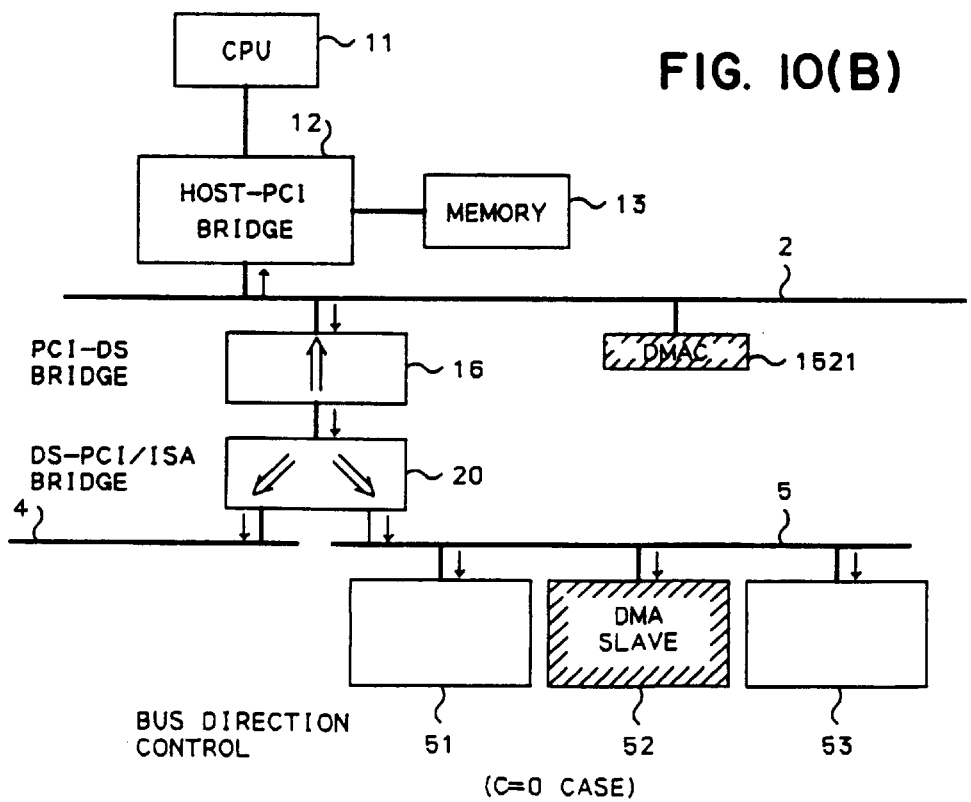

The PCI-DS bridge 16 and the DS-PCI/ISA bridge 20 on the path, which receive the serial GNT#, quickly determine bus direction, based on the information of the fourth bit. The bus directions in the cases where C="H" and C="L" are shown in FIGS. 10(A) and 10(B), respectively. Here, bus direction means address bus and control signal system bus direction.

It is noted that, regarding DACK#s (i.e., DACK#s of DMA slaves) or GNT#s to the PCI master other than in cascade mode, the fourth bit is always "L". Accordingly, they are compatible with cases where the serial GNT# is 3-bit.

In summary, not only serial information for specifying DMA channels for which DMA cycles are executed, but also mode information for indicating whether the DMA channels are set up in cascade mode or not, is transmitted by the serial transfer cycle utilizing the bus access enable signal. If a DMA channel for which a DMA cycle is being executed is in the cascade mode, subsequent bus cycles are executed by the bus master. Thus, by using such mode information, the bridge can promptly determine the bus direction.

As explained above, in the present embodiment of the invention, due to the structures of the RGM 1522 and the LBA 203, the three measures of (1) setting of the two operating states of proceed and freeze, (2) employing the 1T rule, and (3) making the serial GNT# four bits, are implemented in the DMA serial channel protocol. It is noted that setting of the two operating states of proceed and freeze, according to (1) and employing the 1T rule according to (2) can be similarly applied in DMA serial channel protocol between the PC card controller 17 and the RGM 1522.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. A computer system having a PCI bus and an ISA bus for having coupled thereto a plurality of I/O devices, comprising:

a bus arbiter, coupled to the PCI bus, for arbitrating bus accesses by using each of a pair of a bus access request signal line and a bus access enable signal line assigned to bus agents on the PCI bus;

a DMA controller, coupled to the PCI bus, for executing direct memory access (DMA);

a converter, coupled between the ISA bus and the PCI bus and being a bus agent on the PCI bus, for converting states of DMA request signals output from the plurality of I/O devices into first serial information, and for transmitting the first serial information using the bus access request signal lines assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter;

wherein, the converter includes:

DMA request notification means for operating in one of a proceed mode and a freeze mode, the proceed mode for transmitting serial information by using the assigned bus access request signal line whenever a state change of a DMA request signal from each of the I/O devices is generated, and for notifying the DMA controller of a state of a most recent DMA request signal, and the freeze mode for notifying the DMA controller of a state change of a DMA request signal outputted from an I/O device executing a DMA cycle; and means for switching the DMA request notification means from the proceed mode to the freeze mode, after receiving a DMA acknowledgment signal with respect to an I/O device from the request and grant manager means by using the bus access enable signal.

2. The computer system according to claim 1, wherein the converter is a PCI-ISA bridge.

3. The computer system according to claim 1, wherein the I/O devices are PC cards, and the converter is a card controller for controlling the PC cards.

4. The computer system according to claim 2, wherein the PCI-ISA bridge includes bus cycle converting means for converting a bus cycle on the PCI bus into a bus cycle on the ISA bus.

5. The computer system according to claim 2, wherein the PCI-ISA bridge includes means for assigning each of a pair of DMA request signals and DMA acknowledgment signals into the I/O devices, according to mapping information indicating DMA channel numbers to be allocated to each of the I/O devices.

6. A method of controlling an operational state of a bridge coupled between a PCI bus and an ISA bus, the PCI bus coupled to a DMAC core means to enable a DMA cycle to be performed thereon, a plurality of I/O devices coupled to the ISA bus, comprising the steps of:

transmitting, in a proceed mode, serial information indicating states of a plurality of DMA request signals output from each of the I/O devices to the DMAC core means by using a bus access request signal line whenever a state change of DMA request signals from the I/O devices is generated; and switching from the proceed mode to a freeze mode, after receiving a DMA acknowledgment signal with respect to one of the I/O devices by using a bus access enable signal from the DMAC core means.

7. The method of claim 6, further comprising the step of prohibiting from notifying, in a freeze mode, the DMAC core means of a state change of a DMA request signal from one of the I/O devices during execution of a DMA cycle by another one of the I/O devices.

8. The method of claim 6, further comprising the step of notifying the DMAC core means of a state of a latest DMA request signal in the proceed mode.

9. The method of claim 6, wherein further comprising the step of converting states of a plurality of DMA request signals output from each of the I/O devices into serial information.

10. A computer system having a PCI bus and an ISA bus for having coupled thereto a plurality of I/O devices, comprising:

a bus arbiter, coupled to the PCI bus, for arbitrating bus accesses using each of a pair of a bus access request signal line and a bus access enable signal line assigned to bus agents on the PCI bus;

a DMA controller, coupled to the PCI bus, for executing direct memory access (DMA);

a converter, coupled between the ISA bus and the PCI bus, for converting states of DMA request signals output from the plurality of I/O devices into first serial information, and for transmitting the first serial information by using the bus access request signal line assigned thereto; and request and grant manager means, coupled to the PCI bus and the DMA controller, for converting the first serial information into a plurality of DMA request signals for inputting to the DMA controller, for converting respective states of a plurality of DMA acknowledgment signals outputted from the DMA controller into second serial information, and for transmitting the second serial information to the converter by using the bus access enable signal line assigned to the converter;

wherein the converter includes:

DMA request notification means for monitoring a state change of DMA request signals from each of the I/O devices, and for transmitting serial information using the bus access request signal line whenever the state change is monitored, to notify the DMA controller of a state of a most recent DMA request signal, and for differentiating an inactive period of the bus access request signal line between a first case in which third serial information indicating that a DMA request signal from a first one of the I/O devices has been already made active and a new DMA request signal from a second one of the I/O devices is made active is retransmitted and a second case in which fourth serial information indicating that a DMA request signal from the first I/O device selected by a DMA acknowledgment signal using the bus access enable signal line has been made inactive is transmitted.

11. The computer system according to claim 10, wherein the DMA request notification means includes means, when a DMA request signal from the second I/O device is changed to active while a state of the DMA request signal of the first I/O device which has already transmitted first serial information indicating that the DMA request signal line has been made active has not changed, after the bus access request signal line has been changed to inactive only during a first period, for transmitting the third serial information indicating that DMA request signals of both the first and second I/O devices are in active states.

12. The computer system according to claim 11, wherein the DMA request notification means includes means, when a DMA request signal from the first I/O device is made inactive, after the bus access request signal has been changed to inactive after a duration longer than a second period, for transmitting the fourth serial information indicating that the DMA request signal from the first I/O device has been made inactive.

13. The computer system according to claim 10, wherein the converter is a PCI-ISA bridge.

14. The computer system according to claim 10, wherein the I/O devices are PC cards, and the converter is a card controller for controlling the PC cards.

15. The computer system according to claim 13, wherein the PCI-ISA bridge includes bus cycle converting means for converting a bus cycle on the PCI bus into a bus cycle on the ISA bus.

16. A method of notifying a DMAC core means of an operational state of a bridge coupled between a PCI bus and an ISA bus, the PCI bus coupled to the DMAC core means to enable a DMA cycle to be performed thereon and a plurality of I/O devices coupled to the ISA bus, the method of comprising the steps of:

monitoring a state change of DMA request signals from each of the I/O devices;

transmitting to the DMAC core means second serial information indicating that DMA request signals of both first and second ones of the I/O devices are monitored in active states, when a DMA request signal from the second I/O device is changed to active while a state of a DMA request signal of the first I/O device which has already transmitted first serial information indicating that the DMA request signal has been made active has not changed, after a bus access request signal has been changed to inactive only during a first period; and transmitting third serial information indicating that the DMA request signal from the first I/O device has been made inactive, when a DMA request signal from the first I/O device is monitored in an inactive state, after the bus access request signal has been changed to inactive for longer than a second period.

17. A computer system having a PCI bus and an ISA bus for having coupled thereto a plurality of I/O devices, comprising:

a bus arbiter, coupled to the PCI bus, for arbitrating bus accesses using each of a pair of a bus access request signal line and a bus access enable signal line assigned to bus agents;

a DMA controller, coupled to the PCI bus, for enabling direct memory access (DMA) to be performed on the PCI bus;

a bridge, coupled between the PCI bus and the ISA bus, for converting states of a plurality of DMA request signals output from the I/O devices into first serial information, and for transmitting the first serial information using one of the bus access request signal line assigned thereto; and request and grant manager means, coupled to the PCI bus and the DMA controller, for converting the transmitted first serial information into a plurality of DMA request signals for inputting to the DMA controller, for converting respective states of a plurality of DMA acknowledgment signals outputted from the DMA controller into second serial information, and for transmitting the second serial information to the bridge by using the bus access enable signal line assigned into the bridge;

wherein the bridge includes:

means for determining whether a DMA channel specifying that a DMA transfer is to be executed is in a predetermined mode, according to the second serial information; and means for controlling a bus direction corresponding respectively to a bus cycle on the PCI bus by the DMA controller and a bus cycle by one of the I/O devices, according to a result of the determining means.

18. The computer system of claim 17, wherein the I/O device is an ISA bus master on the ISA bus.

19. The computer system of claim 17, wherein the I/O device is an ISA bus slave on the ISA bus.

20. The computer system of claim 17, wherein the predetermined mode is a cascade mode.

21. The computer system according to claim 20, wherein the bridge includes means for setting a transmission direction of address and control signals from the ISA bus to the PCI bus, when the mode information indicates the cascade mode.

22. The computer system according to claim 20, wherein the bridge includes means for setting a transmission direction of address and control signals from the PCI bus to the ISA bus when the mode information indicates a mode other than the cascade mode.

23. A method of controlling a transmission direction of address and control signals on a PCI bus connected to DMAC core means and an ISA bus having a plurality of I/O devices coupled thereto, the ISA bus coupled to the PCI bus through a bridge, the method comprising the steps of:

converting respective states of a plurality of DMA acknowledgment signals outputted from the DMAC core means into acknowledgment serial information;

transmitting the acknowledgment serial information to the bridge using a bus access enable signal line assigned to the bridge;

determining whether a DMA channel specifying that a DMA transfer is to be executed is in a predetermined mode, according to the transmitted acknowledgment serial information; and controlling a bus transmission direction corresponding respectively to a bus cycle on the PCI bus by the DMAC core means and a bus cycle by one of the I/O devices, according to a result of the determining step.

24. The method of claim 23, further comprising the steps of:

converting states of a plurality of DMA request signals outputted from the I/O devices into request serial information;

transmitting the request serial information to the DMAC core means by using the bus access request signal line assigned o the bridge; and converting the transmitted request serial information into a plurality of DMA request signals.

25. The method of claim 23, wherein the acknowledgment serial information includes mode information indicating whether the predetermined mode is a cascade mode, the method comprising a further step of setting a transmission direction of address and control signals from the ISA bus to the PCI bus, when the mode information indicates the cascade mode.

26. The method of claim 23, wherein the acknowledgment serial information includes mode information indicating whether the predetermined mode is a cascade mode, the method comprising a further step of setting a transmission direction of address and control signals from the PCI bus to the ISA bus when the mode information indicates a mode other than the cascade mode.

27. Apparatus for controlling the operational state of a bridge coupled between a first bus and a second bus having a plurality of I/O devices coupled thereto, comprising:

means for converting, in a proceed mode of the bridge, states of DMA request signals output from the plurality of I/O devices into first serial information and for transmitting the first serial information to the first bus whenever a state change of at least one of the DMA request signals is generated; and means for switching an operation mode of the bridge from the proceed mode to a freeze mode when the bridge receives second serial information from the first bus with respect to the DMA request signal generated by one of the I/O devices.

28. The apparatus of claim 27, further comprising means for prohibiting from transmitting, in the freeze mode, a state change of the DMA request signal outputted from one of the I/O devices.

29. The apparatus of claim 27, wherein the transmitting means includes means for transmitting a state of a most recent DMA request signal in the proceed mode of the bridge.

30. The apparatus of claim 27, wherein the bridge includes means for converting the second serial information into a DMA acknowledge signal and for providing the DMA acknowledge signal to the I/O device which generated a corresponding of one of the DMA request signals.

31. The apparatus of claim 27, wherein the first and second buses are a PCI bus and an ISA bus, respectively.

32. Apparatus for controlling the operational of a bridge between a first bus and a second bus, comprising:

means for transmitting serial information to the first bus indicating a state of a request signal output from each of a plurality of I/O devices coupled to the second bus, by using a bus access signal, whenever the state change occurs; and means for differentiating an inactive period of the bus access signal between a first case in which serial information indicating that a first one of the request signals has been already and a second one of the request signals is made active is retransmitted and a second case in which serial information indicating that the first request signal has been made inactive is transmitted.

33. The apparatus of claim 32, further comprising means for monitoring a state change of one of the first and second request signals from the I/O devices.

34. The apparatus of claim 33, wherein the transmitting means includes means, when the second request signal is changed to active while a state of the first request signal, for which has already been transmitted serial information indicating that the first request signal has been made active, has not changed, after the bus access signal has been changed to inactive only during a first period, for transmitting the serial information indicating that the first and second request signals are in active states.

35. The apparatus of claim 34, wherein the transmitting means includes means, when the first request signal is made inactive, after the bus access signal has been changed to inactive for longer than a second period, for transmitting serial information indicating that the first request signal has been made inactive.

36. Apparatus for controlling a transmission direction of a bus, comprising:

means for receiving serial information using a bus access enable signal line;

means for determining whether a data transfer is in a predetermined mode, based on the received serial information; and means for controlling the bus transmission direction on the bus, when the determining means determines that the data transfer is in the predetermined mode.

37. The apparatus of claim 36, wherein the predetermined mode is a cascade mode.

38. The apparatus of claim 37, wherein the serial information includes mode information indicating whether the predetermined mode is the cascade mode.

39. The apparatus of claim 38, wherein the controlling means includes means for setting a certain transmission direction of address and control signals, when the mode information indicates the cascade mode.

40. Apparatus for controlling the operational state of an agent having a plurality of I/O devices, comprising:

means for converting, in a proceed mode of the agent, states of DMA request signals output from the I/O devices into first serial information and for transmitting the first serial information to the first bus arbiter for arbitrating bus access coupled to the agent whenever a state change of at least one of the DMA request signals is generated; and means for switching an operation mode of the agent from the proceed mode to a freeze mode when the agent receives second serial information from the agent with request signal generated by one of the I/O devices.

41. The apparatus of claim 40, further comprising means for prohibiting from transmitting, in the freeze mode, a state of change of the DMA request signal outputted from one of the I/O devices.

42. The apparatus of claim 40, wherein the transmitting means includes means for transmitting a state of a most recent DMA request signal in the proceed mode of the agent.

43. The apparatus of claim 40, wherein the agent includes means for converting the second serial information into a DMA acknowledge signal and for providing the DMA acknowledge signal to the I/O device that generated a corresponding one of the DMA request signals.

44. The apparatus of claim 40, wherein the agent is a card controller coupled to a PCI bus, and the I/O device is a PC card.

45. Apparatus for controlling the operation of a agent having I/O devices, comprising:

means for transmitting to a bus arbiter for arbitrating bus access coupled to the agent, serial information indicating a state of a request signal output from each of a plurality of I/O devices, by using a bus access signal, whenever the state change occurs; and means for differentiating an inactive period of the bus access signal between a first case in which serial information indicating that a first one of the request signals has been already and a second one of the request signals is made active is retransmitted and a second case in which serial information indicating that the first request signal has been made inactive is transmitted.

46. The apparatus of the claim 45, further comprising means for monitoring a state change of one of the first and second request signals from the I/O devices.

47. The apparatus of the claim 46, wherein the transmitting means includes means, when the second request signal is changed to active while a state of the first request signal, for which has already been transmitted serial information indicating that the first request signal has been made active, has not changed, after the bus access signal has been changed to inactive only during a first period, for transmitting the serial information indicating that the first and second request signals are in active states.

48. The apparatus of claim 47, wherein the transmitting means includes means, when the first request signal is made inactive, after the bus access signal has been changed to inactive for longer than a second period, for transmitting serial information indicating that the first request signal has been made inactive.

* * * * *